(12) United States Patent
Moffat et al.

(10) Patent No.: US 10,693,386 B2
(45) Date of Patent: Jun. 23, 2020

(54) CURRENT PROTECTED INTEGRATED TRANSFORMER DRIVER FOR ISOLATING A DC-DC CONVERTOR

(71) Applicant: pSemi Corporation, San Diego, CA (US)

(72) Inventors: Mark Moffat, Mortimer (GB); Scott Andrew Parish, Milton Keynes (GB); Quinn Kneller, Witney (GB); Paul Denny, Chew Magna (GB); Simon Denny, Reading (GB)

(73) Assignee: pSemi Corporation, San Diego, CA (US)

( * ) Notice: Subject to any disclaimer, the term of this patent is extended or adjusted under 35 U.S.C. 154(b) by 0 days.

(21) Appl. No.: 16/262,610

(22) Filed: Jan. 30, 2019

(65) Prior Publication Data
US 2019/0280599 A1   Sep. 12, 2019

Related U.S. Application Data

(62) Division of application No. 15/266,784, filed on Sep. 15, 2016, now Pat. No. 10,277,141.

(51) Int. Cl.
*H02M 1/36* (2007.01)
*H02M 3/337* (2006.01)
(Continued)

(52) U.S. Cl.
CPC .......... *H02M 3/3376* (2013.01); *H02M 1/08* (2013.01); *H02M 1/12* (2013.01); *H02M 1/32* (2013.01);
(Continued)

(58) Field of Classification Search
CPC .......... H02M 1/12; H02M 1/32; H02M 1/08; H02M 2001/0009; H02M 2001/325
(Continued)

(56) References Cited

U.S. PATENT DOCUMENTS 3,681,693 A   8/1972  Hsueh
4,477,867 A   10/1984 Pellegrino
(Continued)

FOREIGN PATENT DOCUMENTS

EP   1361653   11/2003
EP   1744442   1/2007
(Continued)

OTHER PUBLICATIONS

Torres-Rivera, Alex, Office Action received from the USPTO dated Nov. 14, 2017 for U.S. Appl. No. 15/266,784, 9 pgs.
(Continued)

*Primary Examiner* — Alex Torres-Rivera
(74) *Attorney, Agent, or Firm* — Jaquez Land Greenhaus LLP; Bruce W. Greenhaus, Esq.

(57) ABSTRACT

An improved electronic oscillator circuit suitable for use in an isolating DC-to-DC converter circuit, and an improved isolating DC-to-DC converter circuit. In one embodiment, an integrated circuit coupled to a transformer includes an oscillator and an output driver. The integrated circuit is preferably fabricated using a silicon-on-insulator technology. The oscillator outputs an alternating pulse signal defined by electrical characteristics of components other than the transformer. The alternating pulse signal is coupled to the output driver, the alternating output of which is coupled to corresponding legs of the primary winding of the transformer. The secondary winding of the transformer provides an electromagnetically coupled isolated output which may be rectified and filtered to produce a DC output voltage. Additional functionality, such as current protection circuitry for the improved circuits, may be readily added to the integrated circuit at little or no increase in cost.

8 Claims, 13 Drawing Sheets

(51) Int. Cl.
*H02M 3/335* (2006.01)
*H02M 1/08* (2006.01)
*H02M 1/12* (2006.01)
*H02M 1/32* (2007.01)
*H02M 1/00* (2006.01)

(52) U.S. Cl.
CPC ............. *H02M 1/36* (2013.01); *H02M 3/337* (2013.01); *H02M 3/33507* (2013.01); *H02M 2001/0009* (2013.01); *H02M 2001/327* (2013.01)

(58) Field of Classification Search
USPC .......................... 363/50, 56.03, 56.07, 56.1
See application file for complete search history.

(56) References Cited

U.S. PATENT DOCUMENTS

| | | | |
|---|---|---|---|
| 6,101,106 | A | 8/2000 | Shi |
| 6,147,883 | A | 11/2000 | Balakrishnan et al. |
| 9,590,615 | B1* | 3/2017 | Hayakawa ........... H03K 17/165 |
| 10,277,141 | B2 | 4/2019 | Moffat et al. |
| 2004/0217794 | A1 | 11/2004 | Strysko |
| 2009/0116265 | A1* | 5/2009 | Saji .................. H02M 3/33507 363/37 |
| 2009/0141521 | A1* | 6/2009 | Yang ................ H02M 3/33592 363/49 |
| 2011/0090718 | A1 | 4/2011 | Morota |
| 2011/0182090 | A1 | 7/2011 | Huang |
| 2011/0267853 | A1 | 11/2011 | Yang et al. |
| 2012/0025795 | A1 | 2/2012 | Nakashima |
| 2012/0161737 | A1 | 6/2012 | Yamauchi |
| 2013/0058138 | A1 | 3/2013 | Djenguerian et al. |
| 2013/0135775 | A1* | 5/2013 | Yao ....................... H02H 9/025 361/18 |
| 2017/0373603 | A1 | 12/2017 | Basso et al. |
| 2018/0076715 | A1 | 3/2018 | Moffat et al. |

FOREIGN PATENT DOCUMENTS

| | | |
|---|---|---|
| EP | 2278698 | 1/2011 |
| WO | 2018052516 | 3/2018 |

OTHER PUBLICATIONS

Torres-Rivera, Alex, Office Action received from the USPTO dated May 25, 2018 for U.S. Appl. No. 15/266,784, 18 pgs.
Torres-Rivera, Alex, Notice of Allowance received from the USPTO dated Jan. 8, 2019 for U.S. Appl. No. 15/266,784, 24 pgs.
Torres-Rivera, Alex, Notice of Allowance received from the USPTO dated Mar. 12, 2019 for U.S. Appl. No. 15/266,784, 15 pgs.
Moffat, et al., Response filed in the USPTO dated Mar. 12, 2018 for U.S. Appl. No. 15/266,784, 17 pgs.
Moffat, et al., Response filed in the USPTO dated Aug. 7, 2018 for U.S. Appl. No. 15/266,784, 18 pgs.
Vergoosen, Joannes, Invitation to Pay Additional Fee and, Where Applicable, Protest Fee received from the EPO dated Oct. 2, 2017 for appln. No. PCT/US2017/042207, 13 pgs.
Duperron, Nathalie, International Search Report and Written Opinion received from the EPO dated Nov. 17, 2017 for appln. No. PCT/US2017/042207, 22 pgs.
Van Wesenbeeck, R., Written Opinion received from the EPO dated Aug. 15, 2018 for appln. No. PCT/US2017/042207, 11 pgs.
Xu, Pengcheng, et al., "One Flyback Off Line AC/DC Switching Power Supply Design", 2014 9th IEEE Conference on Industrial Electronics and Applications, IEEE, Jun. 9, 2014, pp. 1276-1280, 6 pgs.
Van Wesenbeeck, R., Written Opinion received from the EPO dated Nov. 13, 2018 for appln. No. PCT/US2017/042207, 41 pgs.
Corapci, Mustafa, International Preliminary Report on Patentability received from the EPO dated Feb. 6, 2019 for appln. No. PCT/US2017/042207, 31 pgs.

\* cited by examiner

Oscillator Circuit

CURRENT PROTECTED INTEGRATED TRANSFORMER DRIVER FOR ISOLATING A DC-DC CONVERTOR

CROSS-REFERENCE TO RELATED APPLICATION—CLAIM OF PRIORITY

The present application is a divisional of, and claims priority to, co-pending and commonly assigned U.S. patent application Ser. No. 15/266,784, filed Sep. 15, 2016, entitled "Current Protected Integrated Transformer Driver for Isolating a DC-DC Convertor", and the contents of said Ser. No. 15/266,784 parent application is incorporated herein by reference in its entirety.

BACKGROUND

(1) Technical Field

This invention relates to electronic circuits, and more particularly to isolating DC to DC converter circuits.

(2) Background

An isolating DC-to-DC converter is an electronic circuit that isolates an input direct current (DC) voltage from an output DC voltage, and may convert the input voltage level to another voltage level. Isolating DC-to-DC converter circuits are commonly used in industrial circuits where isolation between circuit grounds (e.g., to prevent ground loops) and/or voltage level-shifting is required.

FIG. 1 is a simplified schematic diagram of a prior art isolating DC-to-DC converter circuit 100 implemented using a discrete transistor relaxation oscillator. A DC voltage VIN is applied to the input terminal, which is connected to the center tap of the primary winding 102 of a saturable-core transformer 104 (e.g., a ferrite core toroidal transformer). The outer "legs" of the primary winding 102 are connected to the collectors of a differential (push-pull) pair of discrete transistors 106a, 106b, the emitters of which are coupled to a first reference potential P1 (e.g., circuit ground). The bases of the discrete transistors 106a, 106b are also connected to a feedback winding 108 on the same transformer 104.

The polarization of the feedback winding 108 is such that the feedback winding 108 couples a small amount of the transformer flux back into the bases of the transistors 106a, 106b to provide positive feedback, generating oscillation. The result is an unstable circuit which self-oscillates at a frequency primarily defined by the electrical characteristics of the transformer 104. The alternating current (AC) signal thus produced is electromagnetically coupled to the secondary winding 110 of the transformer 104, where it is rectified and filtered by a rectification circuit 112 coupled to a second reference potential P2 to produce a DC output voltage VOUT at an output terminal. The illustrated isolating DC-to-DC converter circuit 100 provides galvanic isolation between the $V_{IN}$ and $V_{OUT}$ terminals because there are no direct electrical connections between the terminals. The transformer 104 may provide a voltage conversion function as well, shifting the applied input voltage $V_{IN}$ to a higher or lower $V_{OUT}$ level.

The discrete transistors 106a, 106b in conjunction with the transformer 104 form an electronic relaxation oscillator circuit that is also known as a "Royer" oscillator, named after its inventor, George H. Royer. A Royer oscillator has the advantages of simplicity, low component count, and transformer isolation. However, it has several disadvantages in an isolating DC-DC convertor circuit:

The discrete design requires high-voltage (and thus large) transistors because the inductive load presented by the transformer 104 allows the voltage swing across the discrete transistors 106a, 106b to be significantly higher than the DC input voltage $V_{IN}$. For example, an isolating DC-DC convertor circuit designed for a $V_{IN}$ of 5V DC and a $V_{OUT}$ of 5V DC may require discrete transistors 106a, 106b that can withstand 20V DC because the physics of the transformer result in at least twice $V_{IN}$ across the discrete transistors 106a and 106b (i.e., 10V each). In addition, there are "spikes" of voltage above this level when the transistors turn off due to the inductive nature of the load. The size of these spikes depends on the transformer design and operating frequency.

The frequency performance of the high voltage discrete transistors 106a, 106b limits the maximum operating frequency of the DC-DC convertor circuit.

The oscillator amplitude is limited by transformer saturation. Once the transformer 104 is saturated, energy is required to remove the saturation condition before the transformer 104 can conduct current in the opposite direction. This energy is not transmitted to the secondary winding 110 and is therefore lost from the system, thus reducing the overall efficiency of the circuit.

The energy required to switch the state of the high-voltage discrete transistors 106a, 106b is lost to the system and contributes to efficiency loss.

The oscillation frequency is fixed by the maximum magnetic flux density of the transformer 104, the power supply voltage, and the inductance of the primary winding 102, and cannot easily be changed if needed in order to reduce interference by the oscillator on adjacent electrical circuits.

The requirement of a saturable-core transformer limits the choice of core material.

The requirement of a feedback winding 108 necessitates a three-winding transformer rather than a more compact two-winding transformer.

The physical volume of the transformer 104 required to work well at lower frequencies sets a lower limit on the size of the DC-DC convertor circuit.

Because the isolating DC-DC convertor circuit is implemented using discrete components, there is little opportunity for additional features such as output short-circuit protection, thermal protection, etc., without a significant increase in cost due to the extra separate components required.

Accordingly, there is a need for an improved electronic oscillator circuit suitable for use in an isolating DC-to-DC converter circuit, and for an improved isolating DC-to-DC converter circuit. In meeting such needs, there is a further need to provide protective circuitry for the improved circuitry. The present invention meets these needs.

SUMMARY OF THE INVENTION

The present invention encompasses an improved electronic oscillator circuit suitable for use in an isolating DC-to-DC converter circuit, and an improved isolating DC-to-DC converter circuit. In one embodiment, the discrete transistor pair of a conventional design has been replaced by an integrated circuit that includes an improved electronic oscillator circuit comprising an oscillator and an output driver. The output driver is coupled to corresponding legs of a primary winding of a transformer. A DC voltage $V_{IN}$ is applied to a circuit input terminal which is connected to the center tap of the primary winding of the transformer and to the integrated circuit. The oscillator outputs an alternating pulse signal defined by electrical characteristics of components other than the transformer. The alternating pulse signal is coupled to the output driver, the alternating output of which is coupled to corresponding legs of the primary winding of the transformer. The secondary winding of the transformer provides an electromagnetically coupled isolated output which may be rectified and filtered to produce a DC output voltage $V_{OUT}$ at an output terminal. Notably, the transformer lacks a feedback winding.

In a preferred embodiment, the integrated circuit is fabricated using a silicon-on-insulator (SOI) fabrication technology. The physical size of the integrated circuit generally will be small compared to a conventional discrete transistor circuit, and generally will have a cost that is lower than the cost of the discrete transistors.

Because of the integrated aspect of the integrated circuit that includes the oscillator and the output driver, additional functionality may be readily added to either circuit block at little or no increase in cost. For example, at least one sense and control circuit may be coupled to one or both of the oscillator and the output driver and disable either or both circuits based on any number of events, thus allow the isolating DC-to-DC converter circuit to self-protect if an undesirable operating mode is detected. A variety of circuit aspects or characteristics can be monitored by the sense and control circuit(s) or by other connected circuitry using any number of integrated circuit design techniques. Monitoring functions may include one or more of the following: sensing the current in the output driver to detect over-current or short-circuit events at the output of the isolating DC-to-DC converter circuit; measuring the input voltage to the isolating DC-to-DC converter circuit to detect over-voltage or under-voltage events; measuring the temperature of one or more regions of the integrated circuit to detect other circuit or system malfunction which result in temperature increase; and/or measuring the temperature of one or more regions of the integrated circuit and adjusting the biasing of transistors in the output driver as a function of such temperature measurements. Once a monitored aspect or characteristic reaches a fault level, in some embodiments, the oscillator and/or the output driver may be disabled until the fault is cleared by a user. In other embodiments, an attempt can be made to detect clearance of the fault and re-enable operation of the disabled element.

Particular examples are described of a current protection circuit that prevents over-current events due to large load currents and further enables the charging of large capacitive loads.

The details of one or more embodiments of the invention are set forth in the accompanying drawings and the description below. Other features, objects, and advantages of the invention will be apparent from the description and drawings, and from the claims.

DETAILED DESCRIPTION OF THE INVENTION

The present invention encompasses an improved electronic oscillator circuit suitable for use in an isolating DC-to-DC converter circuit, and an improved isolating DC-to-DC converter circuit. Particular examples are described of a current protection circuit that prevents over-current events due to large load currents and further enables the charging of large capacitive loads.

First Embodiment

Figure 1:
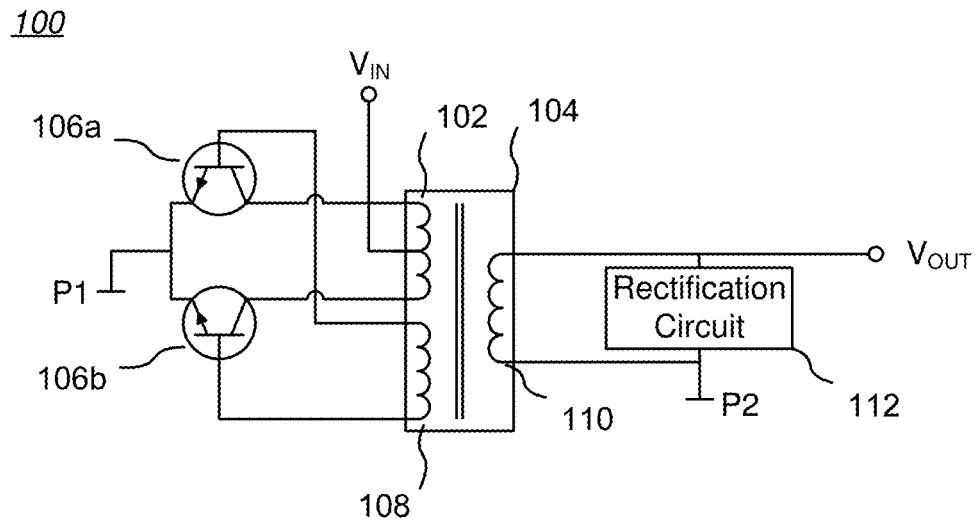
FIG. 1 is a simplified schematic diagram of a prior art isolating DC-to-DC converter circuit implemented using a discrete transistor relaxation oscillator.
Figure 2:
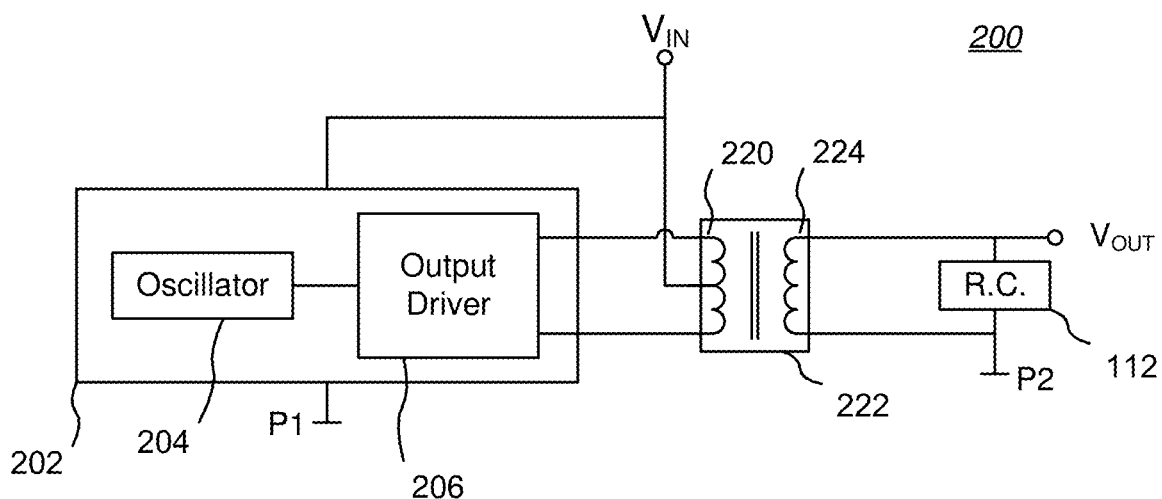
FIG. 2 is a block diagram of a first embodiment of an isolating DC-to-DC converter circuit in accordance with the invention.

FIG. 2 is a block diagram of a first embodiment of an isolating DC-to-DC converter circuit 200 in accordance with the invention. The discrete transistor pair 106a, 106b of FIG. 1 has been replaced by an integrated circuit 202 that includes an improved electronic oscillator circuit comprising an oscillator 204 and an output driver 206. The output driver 206 is coupled to corresponding legs of a primary winding 220 of a transformer 222. A DC voltage $V_{IN}$ is applied to a circuit input terminal which is connected to the center tap of the primary winding 220 of the transformer 222 and to the integrated circuit 202.

The oscillator 204 outputs an alternating pulse signal defined by electrical characteristics of components other than the transformer 222. The alternating pulse signal is coupled to the output driver 206, the alternating output of which is coupled to corresponding legs of the primary winding 220 of the transformer 222. The secondary winding 224 of the transformer 222 provides an electromagnetically coupled isolated output which may be rectified and filtered by a rectification circuit 112 coupled to a second reference potential P2 to produce a DC output voltage $V_{OUT}$ at an output terminal. Notably, the transformer 222 lacks a feedback winding (compare FIG. 1).

The transformer 222 may only provide isolation of the input voltage from the output voltage (i.e., $V_{OUT}=V_{IN}$). However, in some embodiments, the transformer 222 may provide a voltage conversion function, shifting the applied input voltage $V_{IN}$ to a higher or lower $V_{OUT}$ level. For example, with a down-converting transformer 222, a $V_{IN}$ of 5V DC may be transformed to a $V_{OUT}$ of 3V DC, while with an up-converting transformer 222, a $V_{IN}$ of 5V DC may be transformed to a $V_{OUT}$ of 12V DC. In any case, $V_{IN}$ and $V_{OUT}$ are AC coupled but have no DC coupling.

The first reference potential P1 and the second reference potential P2 shown in FIG. 2 may be different or the same. For example, an embodiment of the isolating DC-to-DC converter circuit 200 may have P1=0V DC (i.e., circuit ground) while P2=100V DC. In some applications, such as industrial circuits, P1 and P2 may both have a significant non-zero potential. For example, an embodiment of the isolating DC-to-DC converter circuit 200 may have P1=100V DC while P2=105V DC.

In a preferred embodiment, the integrated circuit 202 is fabricated using a silicon-on-insulator (SOI) fabrication technology. The physical size of the integrated circuit 202 generally will be small compared to the discrete transistors 106a, 106b shown in FIG. 1, and generally will have a cost that is lower than the cost of the discrete transistors 106a, 106b. An advantage of fabrication as an integrated circuit is that additional functionality can be added at little or no increase in cost, as further described below. An advantage of SOI fabrication is that the output transistors can be switched more quickly than discrete transistors. Also, FETs do not suffer from slow recovery from saturation as do the discrete bipolar devices shown in FIG. 1. This allows the use of a higher oscillation frequency and hence a smaller transformer, which reduces the volume of the overall DC-to-DC converter circuit 200.

Example Oscillator Circuit

Figure 3:
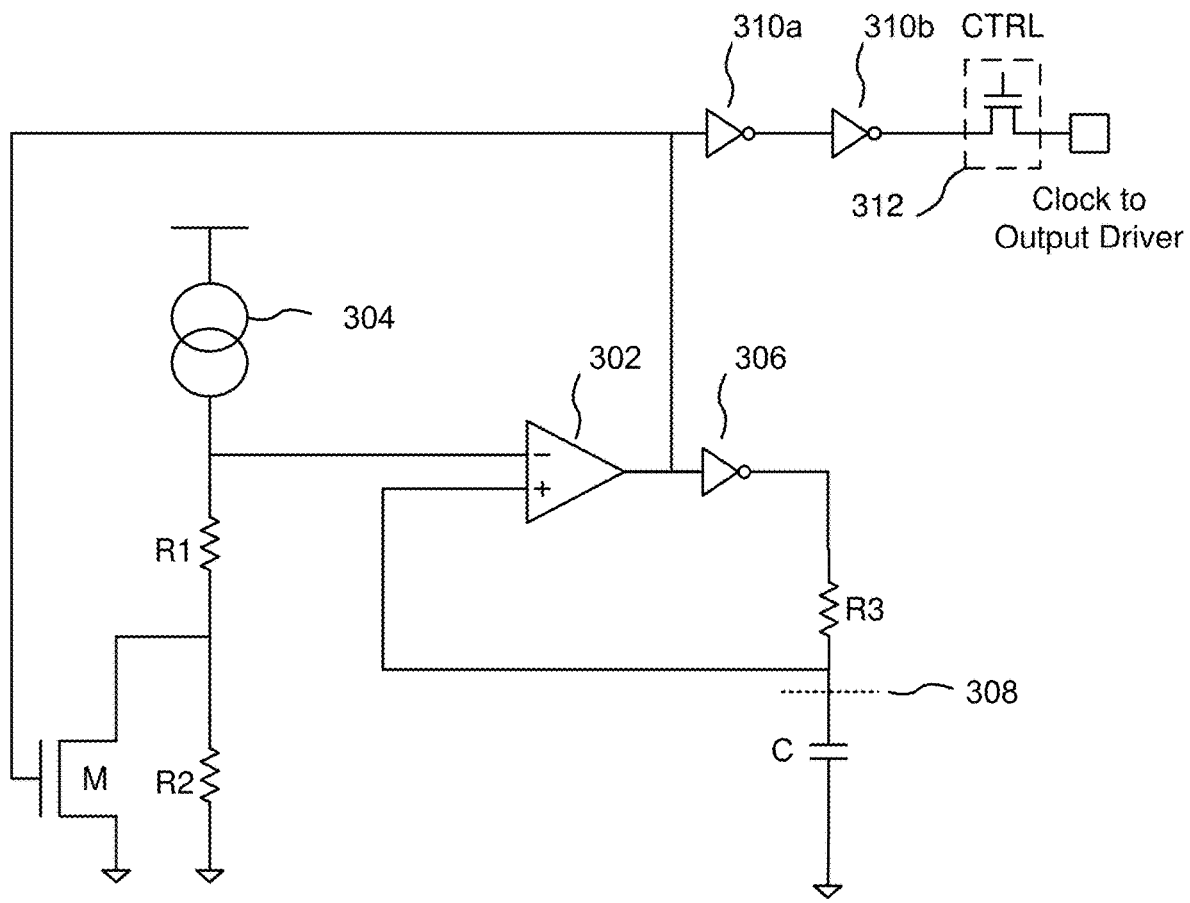
FIG. 3 is a schematic diagram of one embodiment of an oscillator circuit that may be used as the oscillator in the isolating DC-to-DC converter circuit of FIG. 2.

The oscillator 204 of FIG. 2 may be implemented using a number of circuits, including a relaxation oscillator, a crystal oscillator, a phase-locked loop circuit, etc. However, it is useful to embody the oscillator 204 in a form readily implemented on an integrated circuit, with no or few external components. For example, FIG. 3 is a schematic diagram of one embodiment of an oscillator circuit 300 that may be used as the oscillator 204 in the isolating DC-to-DC converter circuit 200 of FIG. 2. In the illustrated embodiment, a first input of a comparator 302 is coupled to a current source 304 (which may have its other terminal connected to $V_{IN}$) that provides a source current $I_S$, and to a pair of series-connected resistors R1, R2 shunted to circuit ground. The output of the comparator 302 is coupled through an inverter 306 and resistor R3 back to a second input of the comparator 302, creating a feedback loop. In some embodiments, the resistor R3 may be replaced with a current source.

Also coupled to the second input of the comparator 302 is a capacitor C, which forms an RC circuit with the resistor R3 and sets the frequency of the oscillator circuit 300. In some embodiments, capacitor C is a variable or adjustable capacitor, thus enabling frequency tuning for the oscillator 204. In some embodiments, capacitor C is external to the integrated circuit 202 (as suggested by the dotted line 308). In general, larger values of R3*C will cause longer charge and discharge rates, thus producing lower frequency oscillations, while smaller values of R3*C will produce higher frequency oscillations. Note that frequency is also set by the voltage swing, which is in turn set in this embodiment by $I_S$*R2.

In the illustrated embodiment, a field effect transistor (FET) M has its drain and source coupled in shunt between the resistors R1, R2, which thus form a resistive divider. The gate of the transistor M is coupled to the output of the comparator 302. In operation, the FET M toggles the resistance connected to the first input of the comparator 302 between R1 and R1+R2 as a function of the output signal of the comparator 302, thus providing some hysteresis so that the oscillator circuit 300 behaves as an astable multivibrator.

In the illustrated circuit, the output of the comparator 302 is coupled to a pair of series-connected inverters 310a, 310b which function as a buffer. The output of the inverters 310a, 310b is a periodic alternating signal (i.e., a clock or pulse signal) that is coupled to an input of the output driver 206 of FIG. 2. In various embodiments, the waveform of the output pulse signal may be, for example, a square wave, triangle wave, or sine wave (which may require additional filtering circuitry), etc., but should have a balanced duty cycle.

As should be clear to one of ordinary skill in the art, there are many other circuits that can produce a periodic alternating pulse signal having a balanced duty cycle that are also readily implementable in an integrated circuit, and which, preferably, have an adjustable or variable frequency. For example, in some circuits, the comparator 302 may be an op amp or a differential amplifier. In other embodiments, instead of an RC circuit, a resistor-inductor (RL) circuit may be used to control the period of the oscillator circuit 300. And, as noted above, other types of IC-compatible circuits may be used, such as a crystal oscillator or a phase-locked loop circuit.

Example Output Driver Circuit

Figure 4:
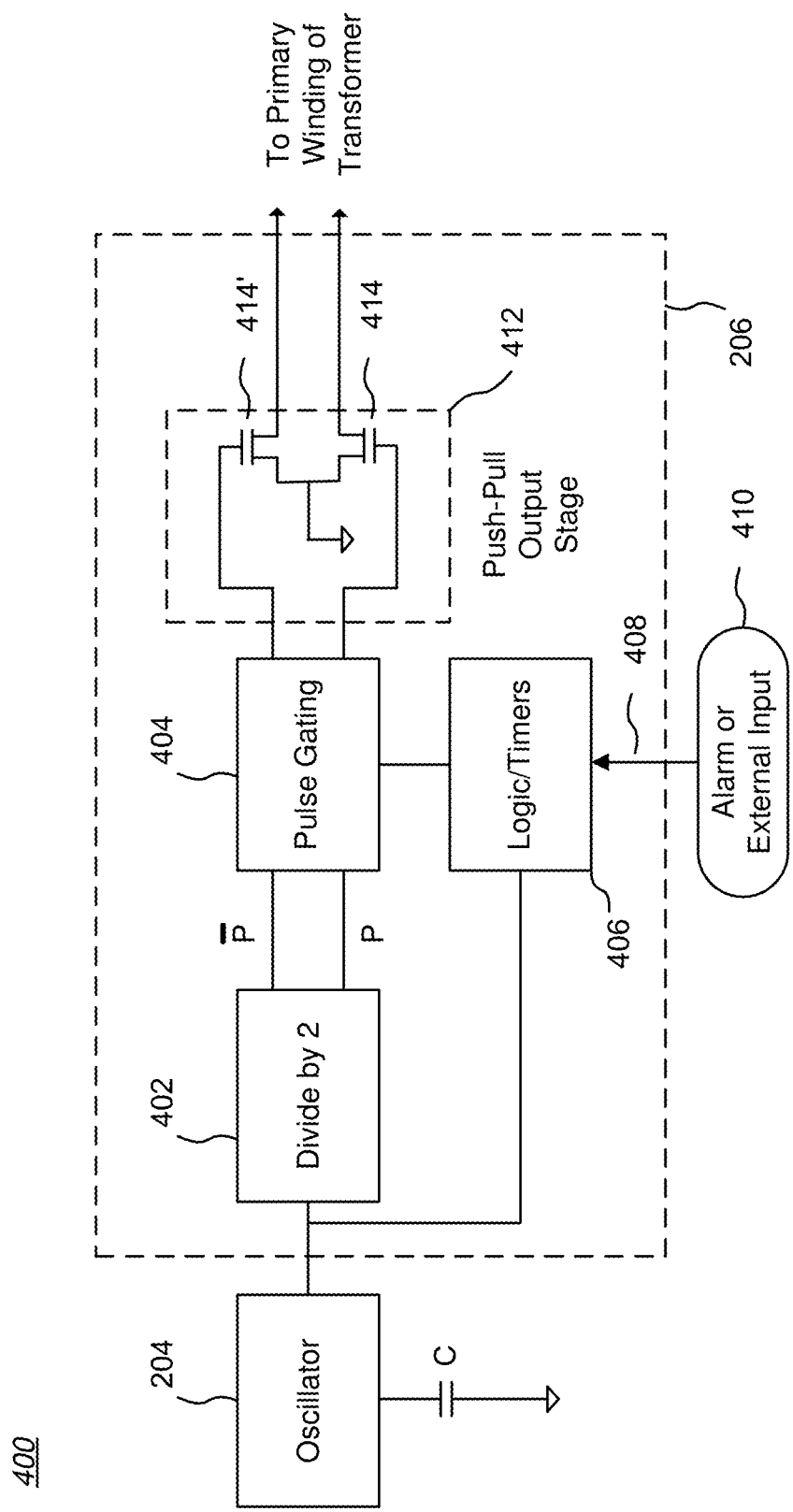
FIG. 4 is a schematic diagram of one embodiment of a driver circuit that may be used as the output driver in the isolating DC-to-DC converter circuit of FIG. 2.

The output driver 206 of FIG. 2 may be implemented using a number of circuits, but again, it is useful to embody the output driver 206 in a form readily implemented on an integrated circuit, with no or few external components. For example, FIG. 4 is a schematic diagram of one embodiment of a driver circuit 400 that may be used as the output driver 206 in the isolating DC-to-DC converter circuit 200 of FIG. 2. In the illustrated embodiment, the pulse signal output of an oscillator 204 (shown here with an external frequency tuning capacitor C by way of example only) is coupled to a divide-by-2 circuit 402, which outputs complementary pulses P and $\overline{P}$ signals with a 50% duty cycle, which is important as a balanced duty cycle prevents rectification and transformer saturation in the output transformer due to residual DC in the output waveform (also known as "flux walking").

In this example, the complementary P and $\overline{P}$ pulses are coupled to a "pass or block" pulse gating circuit 404 which may be coupled to and controlled by a logic/timers block 406. The logic/timers block 406 may be coupled to the pulse signal output of the oscillator 204 and/or to one or more control signals 408, which may be from an on-chip or off-chip alarm circuit or from an external control signal input 410. The logic/timers block 406 may provide a variety of control behaviors, as desired, such as passing or blocking the P and $\overline{P}$ pulses to switch the isolating DC-to-DC converter circuit 200 ON or OFF in response to an external control signal (including a user activated control signal), or if an alarm signal from other circuitry (not shown in FIG. 4) indicates that some adverse event has occurred (e.g., over-current, short-circuit, over-voltage, under-voltage, and/or over-temperature, etc.). As described in further detail below, the logic/timers block 406 can be used to wait until the output driver 206 circuit is re-enabled following a fault event. This allows time for a fault to clear and for the output driver 206 circuit to cool down before an attempt is made to restart the circuit. If a continuous fault occurs, this behavior results in a low-duty cycle operation that prevents damage to the isolating DC-to-DC converter circuit 200 and coupled external circuits while the fault condition is present.

The complementary P and $\overline{P}$ pulses passed by the pulse gating circuit 404 are coupled (directly or indirectly—see FIG. 5) to one or more corresponding transistors 414, 414' of a push-pull output stage 412. The one or more corresponding transistors 414, 414' are in turn coupled to corresponding legs of the primary winding 220 of the transformer 222 of FIG. 2.

Figure 5:
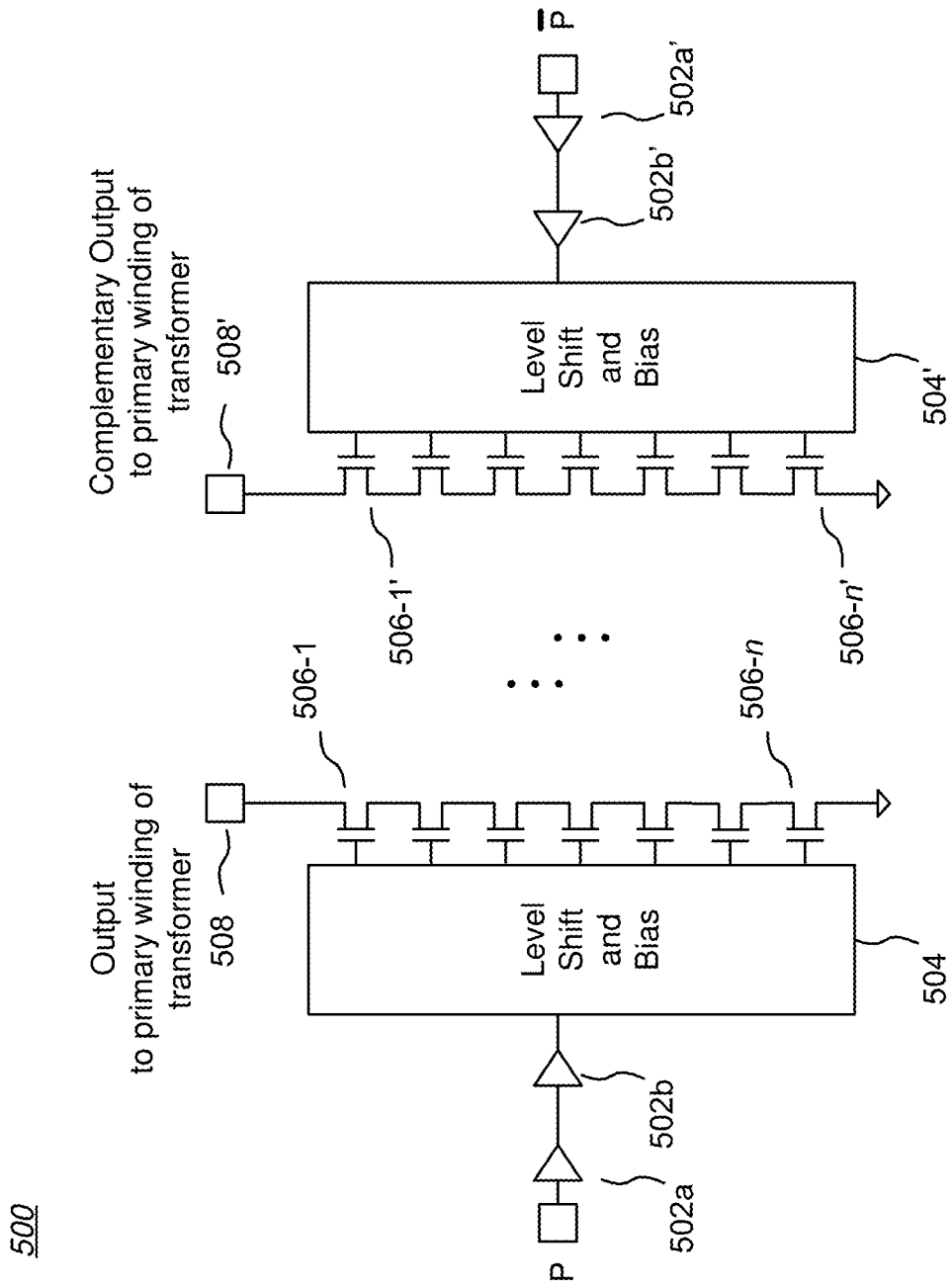
FIG. 5 is a block diagram of one embodiment of a push-pull output stage circuit that may be used in conjunction with the driver circuit of FIG. 4.

FIG. 5 is a block diagram of one embodiment of a push-pull output stage circuit 500 that may be used in conjunction with the driver circuit 400 of FIG. 4. As illustrated, the P and $\overline{P}$ pulses as provided by the push-pull output stage 412 are respectively coupled through one or more corresponding buffers 502a-502b, 502a'-502b' to corresponding level shift and bias circuits 504, 504'. The level shift and bias circuits 504, 504' have one or more outputs each coupled to the gates of a corresponding switch "stack" comprising one or more FETs 506-1 to 506-n, 506-1' to 506-n'. The level shift and bias circuits 504, 504' each provide a suitable level of gate bias voltage and level shifting voltage for switching the coupled transistor gates from ON-to-OFF or OFF-to-ON in response to the state of the P and $\overline{P}$ pulses. The two stacks of FETs 506-1 to 506-n, 506-1' to 506-n' are each shown series coupled between circuit ground and a corresponding connection point 508, 508' for the corresponding legs of the primary winding 220 of the transformer 222 of FIG. 2.

Because of the complementary P and $\overline{P}$ pulses, the stacks of FETs 506-1 to 506-n, 506-1' to 506-n' operate in a push-pull manner, such that the outputs to the primary winding 220 of the transformer 222 are complementary. Accordingly, the logic-level pulse signal from the oscillator 204 is converted to the complementary logic-level P and $\overline{P}$ pulses, which in turn drive the switching of the stacks of FETs 506-1 to 506-n, 506-1' to 506-n', which allow electrical energy to flow through the primary winding 220 of the transformer 222 in alternating directions. The alternating direction of energy flow converts the input DC voltage $V_{IN}$ applied to the center tap of the primary winding 220 of the transformer 222 to an electromagnetically-coupled AC output signal on the secondary winding 224 of the transformer 222 which, after rectification and filtering, is output as an isolated DC voltage, $V_{OUT}$. More particularly, one leg of the primary windings 220 is always conducting current while the other leg is not. Accordingly, there is current flowing at all times in the secondary winding 224 (apart from "glitches" when the current switches from one leg of the primary winding to the other leg). Hence current in the secondary winding 224 is mostly DC.

Because the output driver 206 is implemented on an integrated circuit, preferably using SOI fabrication technology, the output driver 206 can be implemented by serially connecting two or more low-voltage transistors in a stack, as noted above. A major advantage of such a stack configuration is that the breakdown voltage of any individual transistor is not exceeded by an applied signal (including energy that may be transferred back to the output driver 206 from the transformer 222). For example, using SOI-based CMOS FETs, a stack of seven or more FETs within the output driver 206 may withstand a voltage in excess of 20 volts.

Second Embodiment

Figure 6:
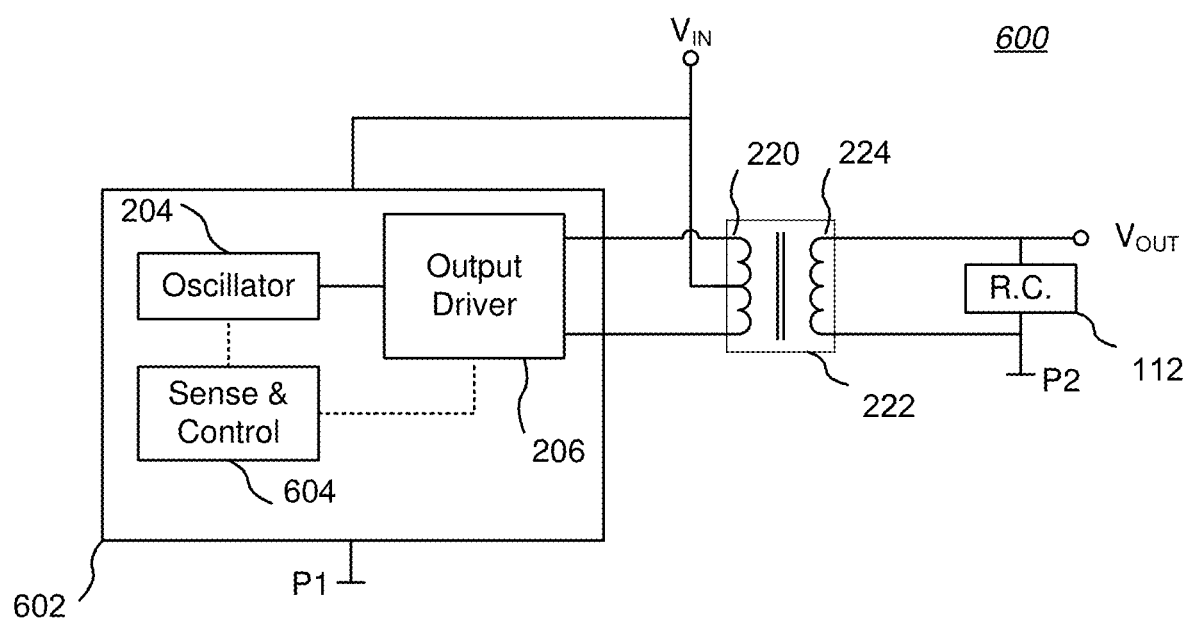
FIG. 6 is a block diagram of a second embodiment of an isolating DC-to-DC converter circuit in accordance with the invention.

Because of the integrated aspect of the integrated circuit that includes the oscillator 204 and the output driver 206, additional functionality may be readily added to either circuit block. For example, FIG. 6 is a block diagram of a second embodiment of an isolating DC-to-DC converter circuit 600 in accordance with the invention. Included on an integrated circuit 602 is the circuitry shown in FIG. 2. Added to that circuitry is a sense and control circuit 604 that may be coupled (unidirectionally or bidirectionally) to one or both of the oscillator 204 and the output driver 206. At least one of the oscillator 204 and the output driver 206 includes deactivation switch circuitry controlled by the sense and control circuit 604, in order to provide the isolating DC-to-DC converter circuit 600 with self-protection capability if an undesirable operating mode is detected (for example, using monitoring functions described below).

For example, in some embodiments, the sense and control circuit 604 may provide an alarm or external input signal 410 to the logic/timers block 406 to switch the output driver 206 OFF (see FIG. 4). In other embodiments, the sense and control circuit 604 in conjunction with a switch within the oscillator circuit 300 of FIG. 3 may block the pulse signal output of the oscillator 204. For example, referring to FIG. 3, an optional FET 312 may be added in series with the connected inverters 310a, 310b and switched by a CTRL signal from the sense and control circuit 604. Alternatively, one of the connected inverters 310a, 310b may be replaced with such a FET, or a FET shunt-to-ground circuit may be used instead of the inline FET 312.

In general, a variety of circuit aspects or characteristics can be monitored by the sense and control circuit 604 (or by other circuitry, not shown, connected to the sense and control circuit 604) in order to monitor the operation of an isolating DC-to-DC converter circuit 200 and in response control the operation of the oscillator 204 and/or the output driver 206. The variety of circuit aspects or characteristics that can be monitored are any that may be readily implemented using any number of integrated circuit design techniques, particularly since the marginal cost of adding most such functions to an integrated circuit is minimal or nil.

Monitoring functions for the isolating DC-to-DC converter circuit 600 may include one or more of the following: sensing the current in the output driver 206 to detect over-current or short-circuit events at the output of the isolating DC-to-DC converter circuit 600; measuring the input voltage to the isolating DC-to-DC converter circuit 600 to detect over-voltage or under-voltage events; measuring the temperature of one or more regions of the integrated circuit 602 to detect other circuit or system malfunctions which result in temperature increase (an over-temperature event); and/or measuring the temperature of one or more regions of the integrated circuit 602 and adjusting the biasing of the FET stacks in the output stage circuit 500 (see FIG. 5) as a function of such temperature measurements (a temperature-sensitive event).

Once a monitored aspect or characteristic reaches a selected fault level, in some embodiments, the oscillator 204 and/or the output driver 206 may be disabled until the fault is manually cleared by a user and the isolating DC-to-DC converter circuit 600 reset. In other embodiments, the integrated circuit 602 can attempt to detect clearance of the fault and automatically re-enable operation of the disabled element. For example, if operation of the isolating DC-to-DC converter circuit 600 had been disabled because of a temperature-based fault mode, and thereafter the temperature of the integrated circuit 602 decreases, the sense and control circuit 604 may automatically re-enable operation (i.e., reactivation after absence of a previously detected fault event). As another example, if operation of the isolating DC-to-DC converter circuit 600 had been disabled, the internal oscillator 204 can be utilized as a timing element which can be used to measure a length of time (e.g., using a simple multi-bit counter within the sense and control circuit 604 to count a set number of clock or pulse signal cycles), after which the oscillator 204 and/or the output driver 206 may be re-enabled. If the fault condition is still present, the oscillator 204 and/or the output driver 206 may again be disabled and the enable/disable process repeated until the fault is finally cleared.

Alternative Oscillator and Driver Circuit

Figure 7:
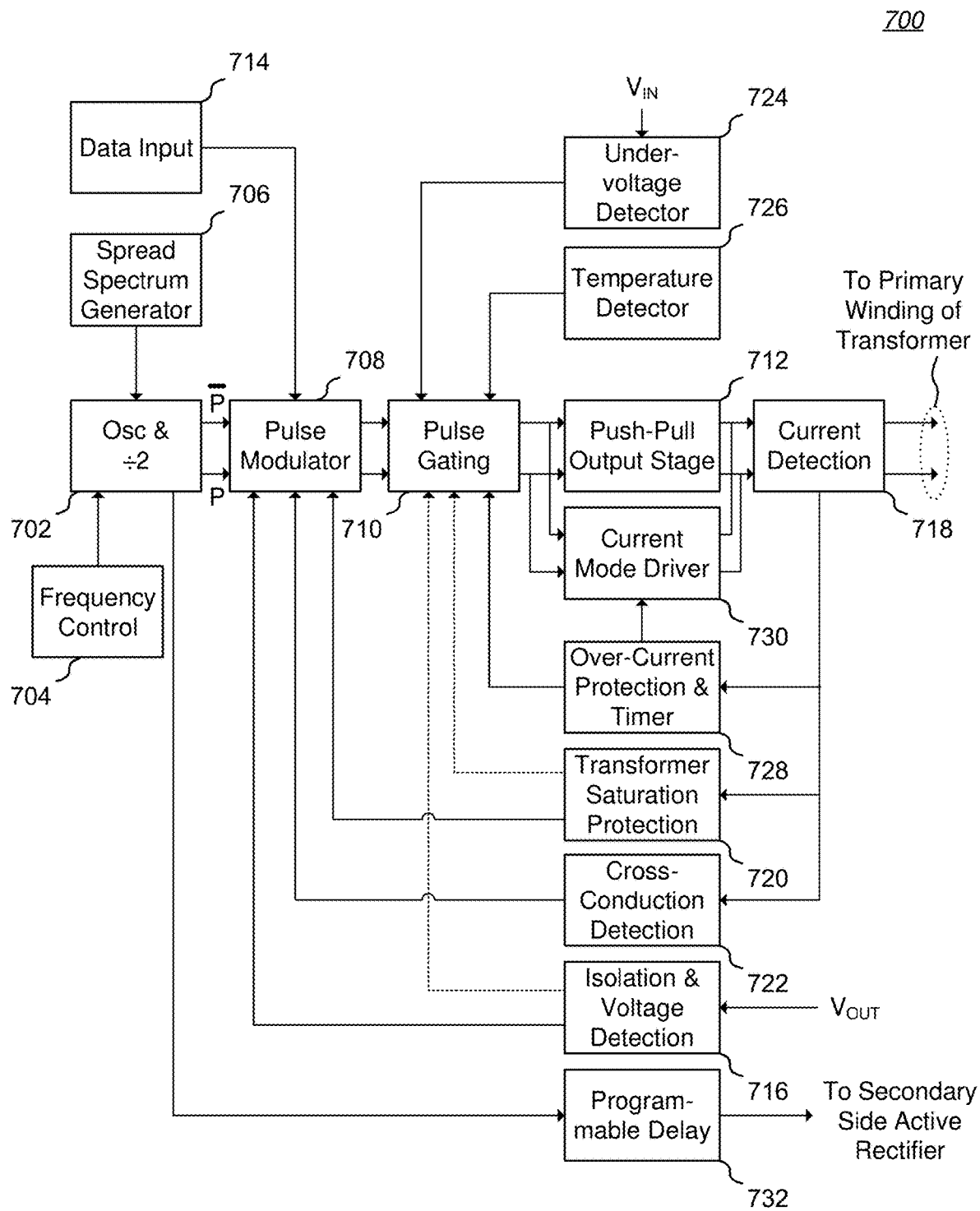
FIG. 7 is a schematic diagram of an alternative embodiment of an oscillator and driver circuit that may be embodied in the integrated circuit of the isolating DC-to-DC converter circuit of FIG. 2.

FIG. 7 is a schematic diagram of an alternative embodiment of an oscillator and driver circuit 700 that may be embodied in the integrated circuit 202 of the isolating DC-to-DC converter circuit 200 of FIG. 2, again illustrating that the integrated aspect of the integrated circuit 202 readily allows adding functionality to the circuit. The illustrated embodiment is similar in many respects to the oscillator and driver circuit embodiments shown in FIG. 4 and FIG. 6, but includes circuitry for modifying the pulse output supplied to the primary winding of a transformer as well as a variety of more specific detection and monitoring elements for overall control of the isolating DC-to-DC converter circuit.

In the embodiment illustrated in FIG. 7, an oscillator and divide-by-2 circuit 702 (equivalent to the oscillator 204 and divide-by-2 circuit 402 of FIG. 4) is coupled to a frequency control 704, which may be external to the DC-to-DC converter circuit 700 and may be as simple as a capacitor (as in FIG. 4). The frequency control 704 is used to set the frequency of the oscillator, and may also be used to synchronize the oscillators on two or more integrated circuits and thereby allow higher power to be driven using parallel-connected devices. The output of the oscillator and divide-by-2 circuit 702 is a set of complementary P and $\overline{P}$ pulses.

Operating an isolating DC-to-DC converter circuit at a fixed frequency means that electromagnetic interference (EMI) will generally occur in the form of unwanted energy in the power supplies and other components of an end user's equipment at both the operating frequency and at harmonics of the operating frequency. This energy can be reduced by dithering or spreading the complementary P and $\overline{P}$ pulses by using a spread spectrum generator 706 to generate signals used to vary the frequency of the oscillator in a pseudo-random manner, in known fashion.

The P and $\overline{P}$ outputs pulse of the oscillator and divide-by-2 circuit 702 are coupled to a pulse modulator 708. The outputs of the pulse modulator 708 are P and $\overline{P}$ pulses (possibly modified as described below), which are coupled to a "pass or block" pulse gating circuit 710, the outputs of which are in turn coupled to a push-pull output stage 712 (which may be the same as the push-pull output stage 412 of FIG. 4).

The pulse modulator 708 allows for modification of the waveforms of the P and $\overline{P}$ pulse outputs (typically square waves with a 50% duty cycle) in response to a data input 714 and/or other control signals. For example, by narrowing the width of each pulse without changing their frequency (e.g., by introducing "dead time" between each pulse), it is possible to reduce the power input to the primary winding of the transformer. Assuming a constant output current, this means that it is possible to reduce the output voltage of the DC-to-DC converter circuit. This effect may be exploited in a feedback mechanism in which the output voltage $V_{OUT}$ of the DC-DC convertor circuit is fed back to the pulse modulator 708 through an isolation and voltage detection circuit 716 in order to provide a regulation function. Isolation may be provided, for example, by an opto-isolator.

Narrowing the pulse width of the P and $\overline{P}$ outputs may also be used to reduce the effects of transformer core saturation on the efficiency of the DC-DC convertor circuit. Once the transformer core is saturated, its inductance will change. This can be sensed and controlled using a current detection circuit 718 coupled to the outputs of the push-pull output stage 712 and to a transformer saturation protection circuit 720 that detects current exceeding a specified threshold and mitigates the effect by applying a control signal to the pulse modulator 708 to narrow the pulse width of the P and $\overline{P}$ outputs. The transformer saturation protection circuit 720 may be alternatively coupled to the pulse gating circuit 710 (as indicated by the dotted connecting line), and block the flow of pulses to the push-pull output stage 712 if saturation occurs.

If there is mutual capacitance between the two outputs of the push-pull output stage 712, or if current continues to flow in the primary transformer winding after the push-pull output stage 712 goes to a high impedance state due to winding inductance, there is a risk that current will flow in both legs of the primary transformer winding at the same time. This is wasted energy, and results in efficiency losses. This situation can be sensed and controlled by coupling the current detection circuit 718 to a cross-conduction detection circuit 722 which determines if current is flowing in both legs of the primary transformer winding. If so, a control signal may be coupled to the pulse modulator 708 to introduce "dead time" between each P and $\overline{P}$ pulse to ensure that current stops flowing in one leg of the transformer before it is enabled in the other leg. The amount of dead-time may also be programmed to a fixed value with an external component or control signal.

The data input 714 connected to the pulse modulator 708 may be an external control signal that sets a selected pulse width for the P and $\overline{P}$ outputs. The external control signal may be provided through the well-known interfaces specified by the MIPI (Mobile Industry Processor Interface) Alliance, or through the well-known Serial Peripheral Interface (SPI) bus, or by direct signal pins, or by any other convenient means. In alternative embodiments, the data input 714 may be coupled to other circuitry internal to the integrated circuited embodying the oscillator and driver circuit 700, allowing various types of feedback control of the pulse modulator 708.

In some embodiments, the control signals from the data input 714 may be modulated so as to encode user data, such as by varying the voltage output of the coupled transformer 222 (see FIG. 2) by varying the width of the P and $\overline{P}$ pulses. Such modulation may be decoded from the output of the secondary winding 224 of the transformer 222, thus providing a method for transferring data across the galvanic barrier and into a different voltage domain.

As noted above with respect to the corresponding element in FIG. 4, the "pass or block" pulse gating circuit 710 can be used to conditionally disable propagation of the P and $\overline{P}$ outputs, and thus pass or block current flow to the legs of the primary winding of a coupled transformer. A number of sense and control circuits may be provided to effectuate such control, as described in the following paragraphs.

As one example, an unacceptably low supply voltage $V_{IN}$ will lead to unpredictable performance from the isolating DC-to-DC converter circuit. An under-voltage detector circuit 724 may be coupled to $V_{IN}$ and set the pulse gating circuit 710 to "block" if a low supply voltage is detected. Once the low voltage event passes, the under-voltage detector circuit 724 sets the pulse gating circuit 710 to "pass". As a practical matter, the under-voltage detector circuit 724 may include some hysteresis to prevent turn-on until the supply voltage returns to a level higher than the initial trigger level.

As another example, excessive circuit temperatures are normally caused by high power draw due to a fault in the system. A temperature detector 726 may be used to measure the temperature of one or more regions of the integrated circuit embodying the oscillator and driver circuit 700. If an over-temperature event is detected, the temperature detector 726 sets the pulse gating circuit 710 to "block" until a manual "reset" is performed or until the detected temperature returns to an acceptable operational level, as described above. In the latter case, as a practical matter, the temperature detector 726 may include some hysteresis to prevent turn-on until the temperature returns to a level lower than the initial trigger level.

One problem that may occur in some embodiments of the oscillator and driver circuit 700 is "in-rush current", in which an initial period of high current is experienced by the oscillator and driver circuit 700 at switch-on, caused by charging a capacitive load effectively coupled between $V_{OUT}$ and the second reference potential P2. The current experienced by the oscillator and driver circuit 700 may be many times higher than steady state current, and designing for this could lead to over-specification of the current handling capability for the circuit. A better solution is to couple the current detection circuit 718 to an over-current protection and timer circuit 728 that detects an over-current event and then switches in a current mode driver 730 in place of the push-pull output stage 712 (the switch components are omitted for clarity); this allows secondary-side capacitance to be charged at a safe current level before normal operation is resumed. Once the over-current event passes, the over-current protection and timer circuit 728 switches the push-pull output stage 712 back into normal operation in place of the current mode driver 730.

High output current may also be caused by a short circuit or fault in the system. Once it has been determined that the reason for high current is not in-rush current, then the over-current protection and timer circuit 728 can set the pulse gating circuit 710 to "block" for a period of time. The over-current protection and timer circuit 728 may attempt to set the pulse gating circuit 710 to "pass" on a periodic basis (e.g., using the oscillator and divide-by-2 circuit 702 as a timer). This allows the system to self-heal in the presence of a temporary fault.

As noted above, the output voltage $V_{OUT}$ of the DC-DC convertor circuit may be fed back to the pulse modulator 708 through the isolation and voltage detection circuit 716 in order to provide a regulation function. In some embodiments, the isolation and voltage detection circuit 716 may be coupled—additionally or in the alternative—to the pulse gating circuit 710 (as indicated by the dotted connecting line) in order to set the pulse gating circuit 710 to "block" if an output short-circuit event is detected, as another form of sense and control circuitry.

In some embodiments, a programmable delay circuit 732 may be coupled to the oscillator and divide-by-2 circuit 702 to allow propagation of the periodic alternating signal generated by the oscillator and divide-by-2 circuit 702 (or some scaled version of the periodic alternating signal) to the secondary winding side of a coupled transformer. The coupled signal should be isolated (e.g., with an opto-isolator), and may be delayed by a specified amount to time or clock cycles to synchronize with the propagation of the P and $\overline{P}$ drive signals through the primary winding over to the secondary winding. The transmission of timing information of the switching waveform generated by the oscillator and divide-by-2 circuit 702 through the programmable delay circuit 732 may be used to switch active rectifying transistors on the secondary winding of a coupled transformer. Using active rectifying transistors allows for higher frequency transformer operation without increased loss due to reverse recovery charge in the passive diodes used in conventional rectifiers.

Current Protection Circuitry

The description above regarding FIG. 7 includes a current detection circuit 718. As a practical matter, it may be desirable to selectively enable the current detection circuit 718 to ensure that over-current events are only detected while the switches of the push-pull output stage 712 are fully closed (and not open, or transitioning to or from a closed state).

Figure 8:
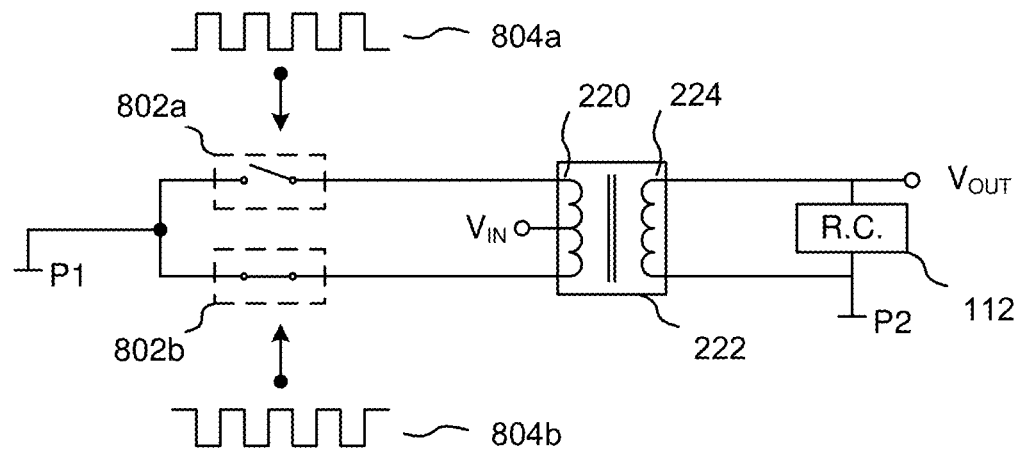
FIG. 8 is a simplified schematic diagram of the driver circuit of FIG. 4, in which the transistors of a push-pull output stage are represented as single-pole, single-throw (SPST) switches.

FIG. 8 is a simplified schematic diagram 800 of the driver circuit 400 of FIG. 4, in which the transistors 414, 414' of a push-pull output stage 412 are represented as single-pole, single-throw (SPST) switches 802a, 802b. Associated with each SPST switch 802a, 802b is a corresponding train of gate drive pulses 804a, 804b from an oscillator (see, e.g., FIG. 4), which are complementary and non-overlapping with respect to each other. In this example, an SPST switch 802a, 802b is activated (closed) when the corresponding train of gate drive pulses 804a, 804b is high. Similarly, an SPST switch 802a, 802b is de-activated (opened) when the corresponding train of gate drive pulses 804a, 804b is low. Transitions from low-to-high occur at a leading (rising) edge of a pulse, and from high-to-low occur at a trailing (falling) edge of a pulse. The leading and trailing edges of each pulse are shown as vertical lines, suggesting instantaneous transitions, but in reality occur over a short amount of time.

As described above, the SPST switches 802a, 802b each drive separate legs of the primary winding 220 of the transformer 222, the center tap of which is coupled to the primary supply voltage $V_{IN}$. When either one of the SPST switches 802a, 802b is closed, it couples its corresponding transformer leg winding to the first reference potential P1 (usually circuit ground). As the SPST switches 802a, 802b open and close in anti-phase, a switching flux is induced in the core of the transformer 222 that creates a switching square wave voltage at the output of the secondary winding 224. The square wave is rectified and filtered by a rectification circuit 112 into a DC output $V_{OUT}$.

The transformer 222 transforms any impedance at the secondary winding 224 to the primary winding 220. Accordingly, if the secondary side is shorted for any reason, then a short circuit between the primary supply voltage $V_{IN}$ and the first reference potential P1 (normally circuit ground) is presented to the SPST switches 802*a*, 802*b*, thereby creating large switch currents that can damage the circuit.

To protect the SPST switches 802*a*, 802*b* from being damaged due to an over-current event, the current in each switch can be measured, and if the current exceeds a specified maximum threshold, then the output current can be limited by suitable current limiting circuitry. As should be clear, the switch current in each SPST switch 802*a*, 802*b* can only be measured while the switch is closed and thus conducting current. If the current is measured while the switch is open, or transitioning to or from a closed state, then an over-current event can be incorrectly detected.

Figure 9:
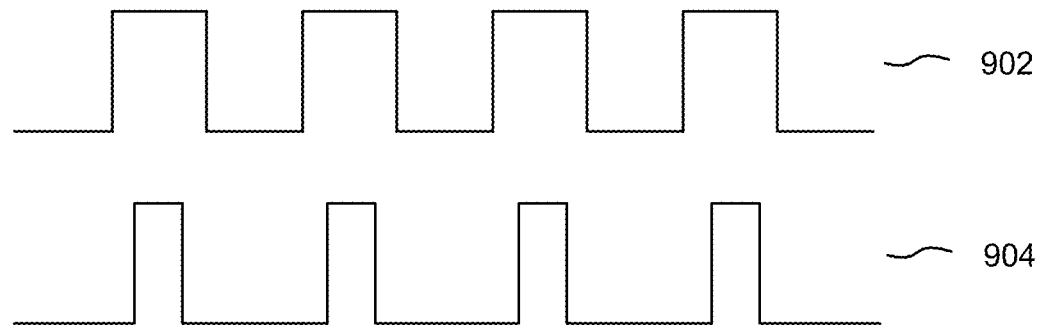
FIG. 9 is timing diagram showing a conceptual method for limiting current measurement to only periods when an output switch is fully closed.

FIG. 9 is timing diagram 900 showing a conceptual method for limiting output current measurement to only periods when an output switch is fully closed. The gate drive pulses that are applied to the gates of the SPST switches 802*a*, 802*b* (taking into account introduced circuit delays) are essentially the same in shape but 180° apart in phase, and thus both may be represented by a single train of applied gate drive pulses 902. A train of edge blanking pulses 904 can be generated that define periods of time in which measurements (in this case, of current) can be taken—and importantly, periods of time in which measurements cannot be taken. The term "edge blanking" means that measurements (in this case, of current) are not taken during the leading (rising) or trailing (falling) edges of the gate drive pulses 902 (again shown as vertical, instantaneous transitions, but in reality occurring over a short amount of time). The method produces a train of edge blanking pulses 904 having a mark time (high time) corresponding to a time period when a corresponding SPST switch 802*a*, 802*b* is closed, and not either transitioning to or from a closed state or in an open state. Stated differently, the edge blanking pulses 904 have a reduced mark time relative to the gate drive pulses 902, and the mark time of the edge blanking pulses 904 is only coincident with the mark time of the gate drive pulses 902 and not coincident with the rising or falling edges of the gate drive pulses 902.

A complicating issue is that the gate drive pulses 902 are not exactly coincident with the original gate drive pulses output by the oscillator. Taking into account circuit delays, generally there is insufficient time to generate the edge blanking pulses 904 from the gate drive pulses 902. However, the edge blanking pulses 904 may be generated from the original gate drive pulses.

Figure 10A:
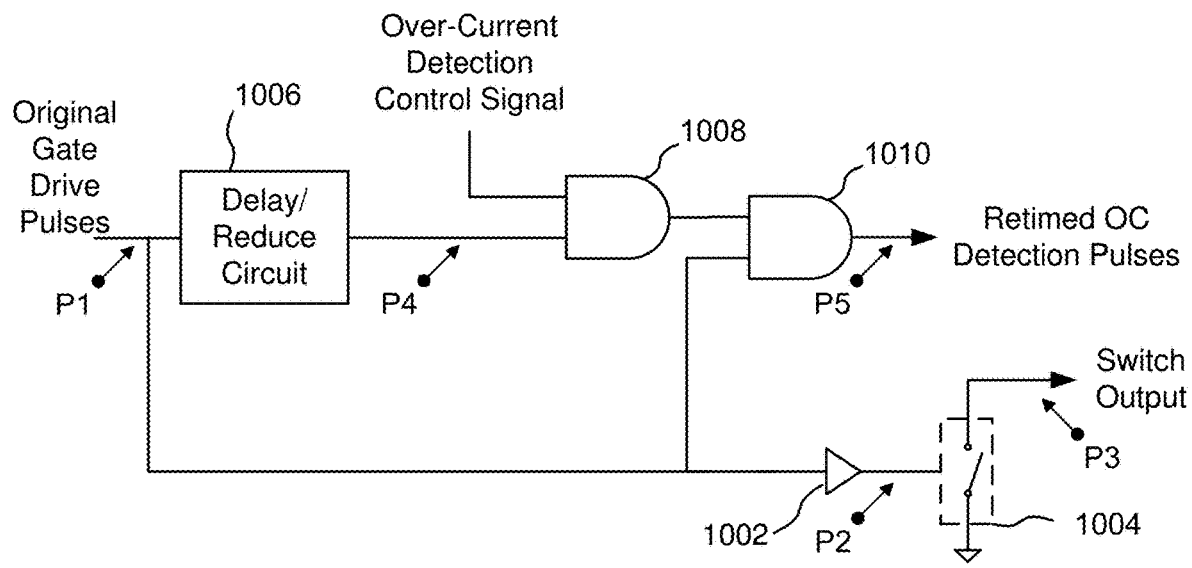
FIG. 10A is schematic diagram of one embodiment of a circuit for generating the edge blanking pulses shown in FIG. 9.
Figure 10B:
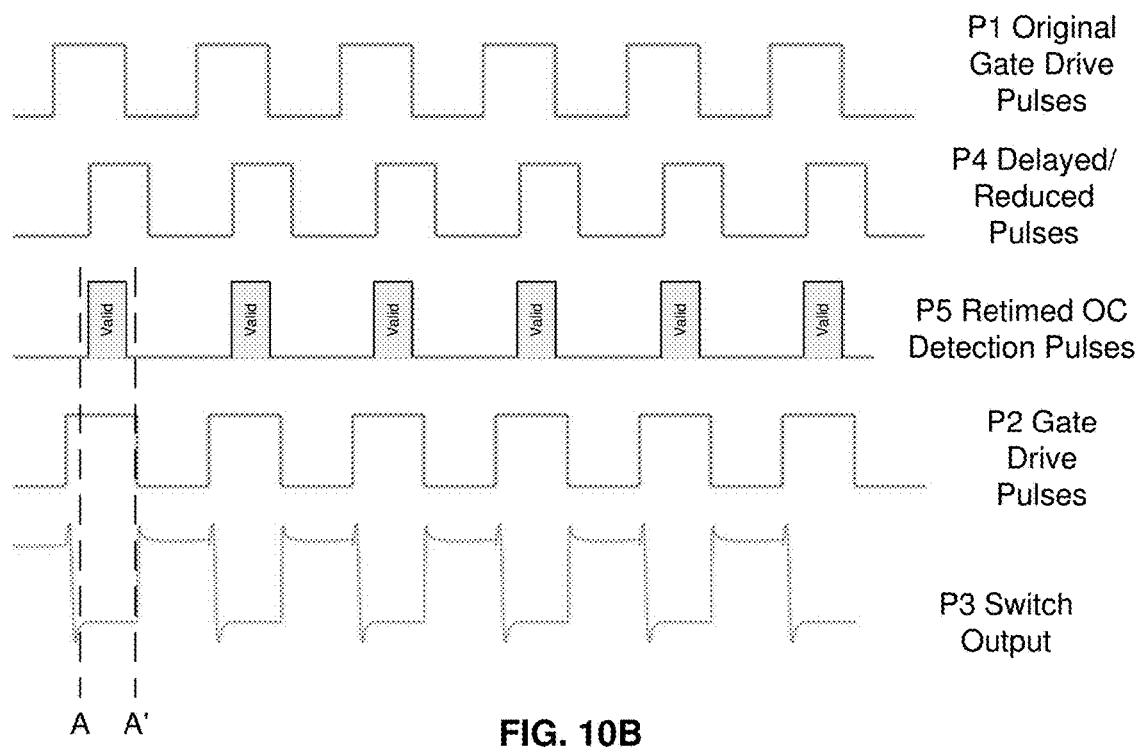
FIG. 10B is a set of timing diagrams corresponding to selected points in the circuit of FIG. 10A.

FIG. 10A is schematic diagram of one embodiment of a circuit 1000 for generating the edge blanking pulses 904 shown in FIG. 9. FIG. 10B is a set of timing diagrams 1050 corresponding to selected points in the circuit of FIG. 10A (the timings in FIG. 10B are not necessarily indicative of the actual timings in a real circuit, but are provided for illustrative purposes).

Original gate drive pulses are applied at P1 and propagate through a buffer 1002 which drives the gate of an SPST switch 1004. The buffer 1002 introduces a delay to the original gate drive pulses applied at P1, thus producing delayed gate drive pulses at P2 (i.e., the pulses at P2 are a time-shifted replica of the pulses at P1). When the SPST switch 1004 is turned ON by the rising edge of the delayed gate drive pulses at P2, the switch output current at P3 takes some time to settle to its final value; for example, inductive/capacitive loads can cause overshoot/ringing in the switch output, as shown in the graph of P3 in FIG. 10B. Erroneous measurements of the circuit current may occur if taken before the current has settled. Therefore, a significant amount of time is generally required (e.g., about 100 ns) to allow the current to settle before measurements are taken.

When the SPST switch 1004 is turned OFF by the falling edge of the delayed gate drive pulses at P2, the switch output current at P3 also takes some time to settle. However, as long as the measurements are completed before the falling edge of the delayed gate drive pulses at P2, then it is guaranteed that the current will not be measured as the SPST switch 1004 turns OFF.

The original gate drive pulses at P1 are also applied to a delay/reduce circuit 1006, an embodiment of which is described in greater detail below. In one embodiment, the delay/reduce circuit 1006 performs two functions: it produces delayed pulses at P4 having rising edges that are delayed with respect to the rising edges of the original gate drive pulses applied at P1, and reduces the mark time of the delayed pulses at P4 with respect to the mark time of the original gate drive pulses applied at P1 (i.e., the mark-to-space ratio of the pulses at P4 is reduced). In another embodiment, the delay/reduce circuit 1006 only produces delayed pulses at P4 having rising edges that are delayed with respect to the rising edges of the original gate drive pulses applied at P1 (the reduce—or re-time—function being performed by AND gate 1010, as described below). The amount of delay introduced by the delay/reduce circuit 1006 generally should be set to compensate for the total amount of delay (from all sources) of the original gate drive pulses at P1 to the gate drive pulses at P2 such that the edge blanking pulses 904 are timed with respect to the gate drive pulses as shown in FIG. 9.

In the illustrated example, the delayed/reduced pulses at P4 are coupled to a first AND gate 1008, the other input of which is an Over-Current Detection Control Signal. The Over-Current Detection Control Signal can be an externally supplied control signal used to activate or deactivate the over-current detection circuitry. Logically AND'ing the Over-Current Detection Control Signal and the delayed/reduced pulses at P4 ensures that only over-current events occurring after the rising edge of the original gate drive pulses are measured.

In the illustrated example, the output of the first AND gate 1008 is applied to a second AND gate 1010, the other input of which is the original gate drive pulses applied at P1. The second AND gate 1010 is used to re-time the falling edge of the delayed/reduced pulses at P4 to generate retimed over-current (OC) detection pulses at P5. The second AND gate 1010 is useful because the delay/reduce circuit 1006 not only delays the rising edge of the original gate drive pulses, but also delays the falling edge (although the delay on the falling edge is much less than the rising edge, hence the mark reduction). The second AND gate 1010 thus ensures that its output is valid only before the falling edge of the original gate drive pulses applied at P1. The retimed OC detection pulses at P5 then control (gate) the operation of a current detection circuit (not shown). Of note, the second AND gate 1010 is not needed if the falling edge delay in the buffer 1002 and the SPST switch 1004 is greater than the falling edge delay of the delay/reduce circuit 1006.

The signal delay caused by the buffer 1002 that drives the SPST switch 1004 is much greater than the delay in the AND gates 1008, 1010. With a suitable delay introduced by the delay/reduce circuit 1006 to compensate for the timing difference between (1) the original gate drive pulses applied at P1 and (2) the gate drive pulses at P2 plus the settling time of the SPST switch 1004, the retimed OC detection pulses at P5 will only be valid when the SPST switch 1004 is closed (i.e., ON). In FIG. 10B, compare the P3 pulse train for the switch output to the P5 pulse train of the retimed OC detection pulses, noting that the P5 pulse train is constrained to fall within the ON time of the P3 pulse train, as indicated by dashed lines A-A'. Accordingly, the retimed OC detection pulses at P5 ensure that an over-current event is not measured while the SPST switch 1004 is open, or transitioning to or from a closed state.

Figure 11:
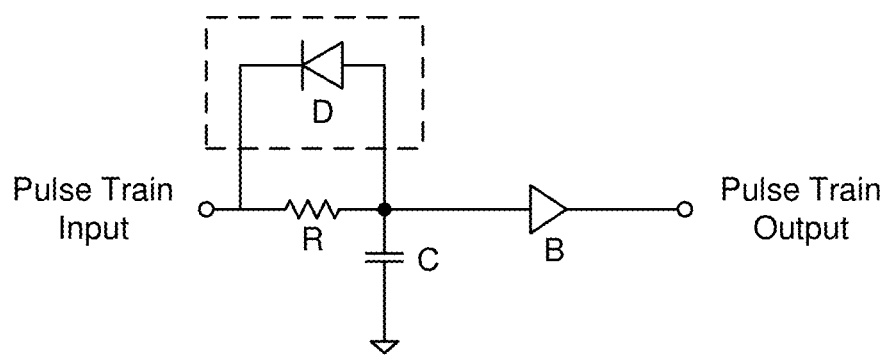
FIG. 11 is a schematic diagram of one circuit for generating a delayed and reduces pulse train, suitable for use as the delay/reduce circuit of FIG. 10A.

FIG. 11 is a schematic diagram of one circuit 1100 for generating a delayed and reduces pulse train, suitable for use as the delay/reduce circuit 1006 of FIG. 10A. A pulse train input is applied to an RC circuit comprising an input resistor R and a shunt capacitor C coupled between the resistor R and circuit ground. A buffer B connected to a node between the resistor R and capacitor C provides a delayed and reduced pulse train output. An optional diode device D may be coupled in parallel with the resistor R to provide a fast discharge path for the capacitor C; the diode device D may be a diode or another one-way device, such as a diode-connected FET.

In operation, the rising and falling edges of an applied input pulse are delayed at the output of the circuit 1100 by the RC time constant of the RC circuit. If the diode device D is included, the falling edge is delayed less (i.e., falls faster), since the capacitor C discharges through the diode device D. More particularly, without the diode device D, the circuit 1100 is symmetric in time and therefore provides a delay, but not a reduction in mark time. With the diode device D, the circuit 1100 is asymmetric in time since the diode device D reduces the RC time constant for the falling edge, and therefore the circuit 1100 provides a delay and reduces the mark time. However, for the circuit shown in FIG. 10A, the faster falling edge is redundant (and thus the diode device D may be omitted) since the output of the delay/reduce circuit 1006 at P4 is re-timed by the falling edge of the original gate drive pulses at P1 applied to the second AND gate 1010.

As should be clear, other circuits may be utilized for the delay/reduce circuit 1006 so long as such circuits delay and reduce the retimed OC detection pulses at P5 to fall within the ON time of the P3 switch output pulse train. In particular, the first and second AND gates 1008, 1010 represent any circuit that performs an AND'ing function, which may be implemented using combinations of other logic gates or circuits. Further, the first and second AND gates 1008 may be replaced by a 3-input AND gate (which internally performs essentially like the two serially connected 2-input AND gates shown in FIG. 10A).

As noted above, one problem that may occur in some embodiments of the oscillator and driver circuit 700 (see FIG. 7) is "in-rush current", in which an initial period of high current is experienced by the oscillator and driver circuit 700 at switch-on, caused by charging a capacitive load effectively coupled between $V_{OUT}$ and the second reference potential P2. The current experienced by the oscillator and driver circuit 700 may be many times higher than steady state current, and designing for this could lead to over-specification of the current handling capability for the circuit, or even damage the circuit. As noted above, a better solution is to couple the current detection circuit 718 to an over-current protection and timer circuit 728 that detects an over-current event and then switches in a current mode driver 730 in place of the push-pull output stage 712 (the switch components are omitted for clarity); this allows secondary-side capacitance to be charged at a safe current level before normal operation is resumed. Once the over-current event passes, the over-current protection and timer circuit 728 switches the push-pull output stage 712 back into normal operation in place of the current mode driver 730.

In-rush of current to charge external load capacitors is not the only type of over-current event that can damage the oscillator and driver circuit 700. Over-current conditions also can be caused by short circuit loads across the output and/or high current loads.

More specifically, this aspect of the invention includes circuits and methods to protect the output of an oscillator and driver circuit from large load currents. Embodiments include an over-current protection circuit that measures the current through the circuit output switch that is connected to the primary winding of a coupled transformer. If the measured current exceeds a selected safe reference current level, the circuit is reconfigured to drive the switch from a pulsed current source that limits the output current to a safe maximum limit. The circuit stays in the current mode for a selected time before reverting back to its normal push-pull mode, while continuing to monitor the circuit output current. This process is thus continuous, so that whenever the load current exceeds the safe reference current, then the circuit will switch over to the current mode driver configuration. In this way, the circuit is protected from large load currents caused by any of: short circuit loads across the output, power-on current surges to charge external load capacitors, and/or high current loads that could damage the circuit.

Figure 12:
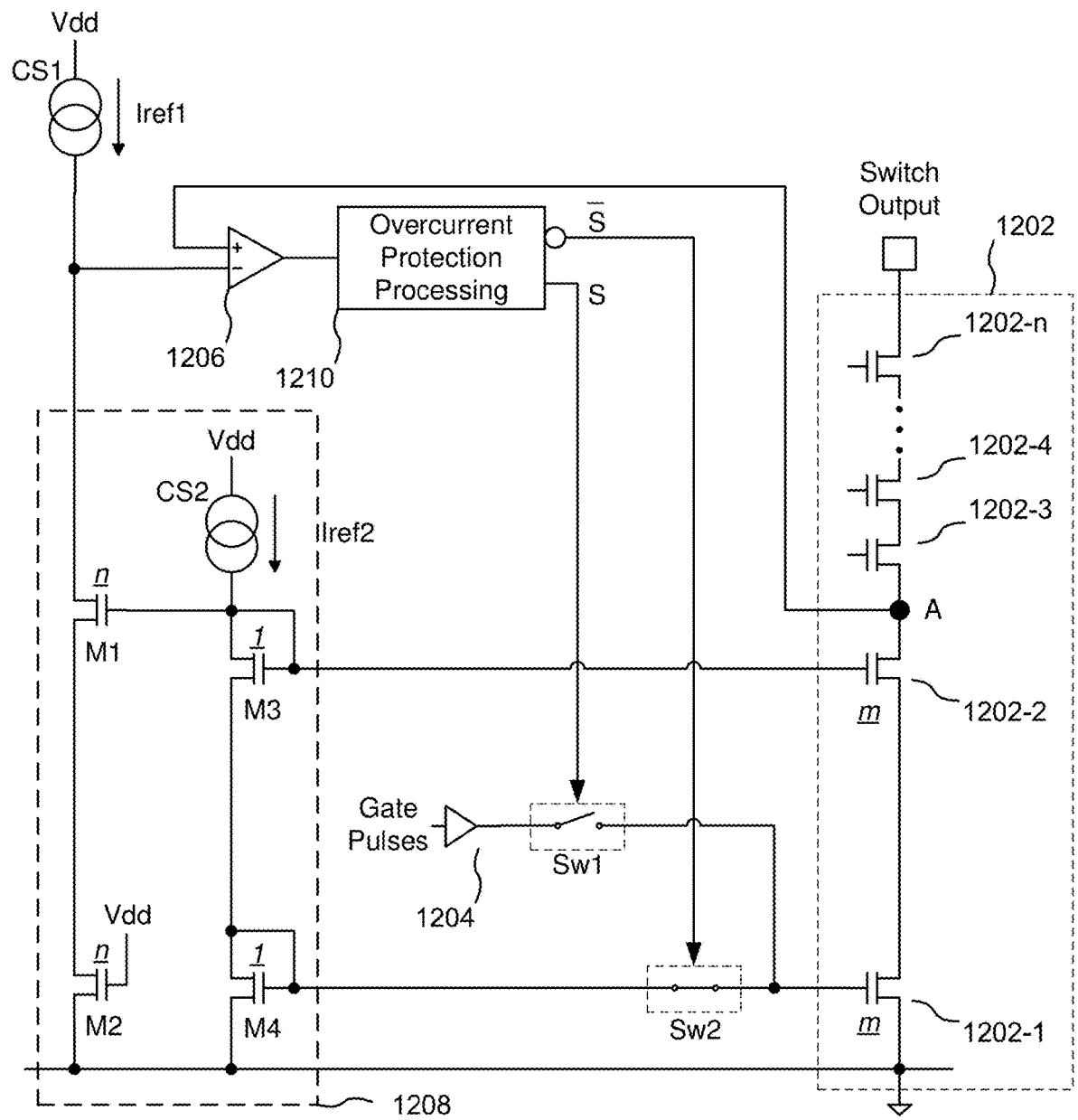
FIG. 12 is a schematic diagram of an over-current protection circuit suitable for switching between a current mode driver and a push-pull output driver for a switch "stack" comprising one or more FETs.

FIG. 12 is a schematic diagram of an over-current protection circuit 1200 suitable for switching between a current mode driver and a push-pull output driver for a switch "stack" 1202 comprising one or more FETs 1202-1 to 1202-n (for clarity, bias voltage connections for FETs 1202-3 to 1202-n are omitted). Respective sets of the switch stack 1202 may be used, for example, as the SPST switches 802a, 802b in FIG. 8; accordingly, the over-current protection circuit 1200 would be replicated for each SPST switch 802a, 802b. As should be clear, the switch stack 1202 behaves like a single-pole, single-throw (SPST) switch.

In the illustrated embodiment, output gate pulses from the oscillator and driver circuit 700, generated as described above, are applied through a buffer 1204 (e.g., back-to-back inverters) and to a first SPST switch Sw1, which may be implemented as a FET. The output of the first switch Sw1 is coupled to at least the gate of the "bottom" FET 1202-1 of the switch stack. The output of the switch stack is configured to be connected to one leg of the primary winding of a coupled transformer, as described above. The gate of FET 1202-1 is also coupled to a second SPST switch Sw2, the input to which is a pulsed control circuit 1208 that, when operative, actively regulates the voltages applied to the gate of at least FET 1202-1 to limit current through the FET stack 1202, and thus limit energy flow through the coupled leg of the primary winding of a transformer.

A comparator 1206 is configured such that one input is coupled to sense the voltage at a node between a reference current source CS1 and the pulsed control circuit 1208, while the other input is coupled to the FET stack 1202 to sense a voltage in the FET stack 1202 indicative of the current through the FET stack 1202. The comparator 1206 outputs a comparison signal that indicates which of the two inputs is greater than the other input. The comparison signal is coupled to an over-current protection processing circuit 1210, which in turn outputs complementary, non-overlapping switching signals S, S that are coupled as control signals to the Sw1 and Sw2 switches, respectively; thus, when one of the switches Sw1, Sw2 is closed (conducting), the other switch Sw2, Sw1 is open (non-conducting).

In the illustrated embodiment, the switch output current through the stack 1202 of FETs 1202-1 to 1202-n is measured by sensing the voltage at the drain of FET 1202-2 in the stack (node A). Sensing at FET 1202-2 gives a larger voltage than if sensed at the drain of FET 1202-1, and thus is less sensitive to noise and offsets in the comparator 1206. However, in some applications, the sensing point may be at another location in the switch stack 1202.

In the illustrated embodiment, the pulsed control circuit 1208 comprises a set of FETs M1-M4 and a pulsed current source CS2. The current output from pulsed current source CS2 varies (for example, as gated by the oscillator 204) from zero current to Iref2, where Iref2 is a set reference current. FETs M3 and M4 are diode connected and in series between CS2 and circuit ground; each has a relative size of "1", as indicated in FIG. 12 FETs M1 and M2 are series connected between CS1 and circuit ground; each has a relative size of n, as indicated in FIG. 12 [note: this is not the same "n" used to enumerate the FETs 1202-1 to 1202-*n*]. FETs 1202-1 and 1202-2 each has a relative size of m, as indicated in FIG. 12. The reference current Iref1 is applied to FETs M1 and M2 and these devices are ratioed to FETs 1202-2 and 1202-1, respectively. The size of the FETs may be defined in terms of transistor area, gate length, gate width, etc., so long as the same aspect is compared. In the illustrated example, the relative sizes of the FETs are such that m>n>1. The gate of FET M4 is coupled to the gate of FET 1202-1 (and thus have the same bias level), while the gates of FET M3 and M1 are coupled to the gate of FET 1202-2 (and thus have the same bias level). As can be appreciated by one of ordinary skill in the art, PETS M3, M4, 1202-1 and 1202-2 comprise a current mirror having a current ratio of 1/m with respect to the FET stack 1202.

The operation of the over-current protection processing circuit 1210 is fairly straightforward. The reference current Iref1 sets up a reference voltage on one input of the comparator 1206 (the inverting input, in this example); the other input of the comparator 1206 is coupled to node A, which has a voltage determined by the current passing through the switch stack 1202. If the measured current through the switch stack 1202 is less than a selected maximum operating current Imax, as determined by the comparator 1206, then switch Sw1 is set to a closed (conducting) state and switch Sw2 is set to an open (non-conducting) state. Accordingly, gate pulses from the oscillator and driver circuit 700 applied to the buffer 1204 are coupled to the gate of FET 1202-1, which provides normal levels of switched current to a corresponding leg of a coupled primary transformer. In the illustrated embodiment, current source CS1 provides a reference current Iref1=Imax*(n/m); stated differently, the maximum operating current Imax through the FET stack 1202 in normal operation is proportional to the selected reference current Iref1: Imax=Iref1*(m/n).

Conversely, as current through FETs 1202-1 and 1202-2 increases, then at the maximum operating current, Imax, for the switch stack 1202, the voltage at node A reaches the reference voltage set up by Iref1, as determined by the comparator 1206, and switch Sw1 is set to an open (non-conducting) state and switch Sw2 is set to a closed (conducting) state. Accordingly, gate pulses from the pulsed control circuit 1208 are coupled to the gate of FET 1202-1, which provides limited levels of switched current to a corresponding leg of a coupled primary transformer. More particularly, when the pulsed control circuit 1208 is operatively connected to the gate of FET 1202-1 because an over-current condition has occurred, the pulsed control circuit 1208 controls the voltage at the gate of FET 1202-1 so as to limit the output current through the FET stack 1202 to be no more than a fixed value, Ifixed, which is proportional to Iref2: Ifixed=Iref2/m.

The over-current protection processing circuit 1210 may include a timing circuit as well, such that if an over-current event is detected, the pulsed control circuit 1208 is coupled to the gate of FET 1202-1 through switch Sw2 for only a limited time. At the expiration of that set time, the outputs S, S̄ are toggled, allowing normal operation to resume by coupling gate pulses from the oscillator and driver circuit 700 to the gate of FET 1202-1 through switch Sw1. If an over-current condition persists, then the pulsed control circuit 1208 is again coupled to the gate of FET 1202-1 for a limited time, the cycle repeating until the over-current condition ceases.

Advantages of the Invention

The isolating DC-to-DC converter circuit embodiments shown in FIG. 2 and FIGS. 6 and 7 have an integrated circuit-based oscillator 204 that operates independently of the coupled isolating transformer 222. Accordingly, circuit operation does not rely on feedback windings in the transformer, and the transformer can be simplified because fewer windings are required (two versus three, as in FIG. 1), thus reducing cost.

Further, the oscillation function does not rely on transformer saturation; accordingly, by keeping the transformer 222 out of its saturation region, less energy is expended and overall efficiency is improved. For example, excluding transformer and rectification losses for a system (which depend on the implementation of these external components), a conventional isolating DC-to-DC converter circuit 100 of the type depicted in FIG. 1 may have an efficiency as low as 35%, and generally less than about 75% to about 80%. In contrast, with the same exclusions, a properly implemented isolating DC-to-DC converter circuit 200 of the type depicted in FIG. 2 typically will have an efficiency of no less than about 80%, and efficiencies as high as 85% have been demonstrated.

In addition, the oscillation frequency of the integrated oscillator 204 does not rely on the electrical characteristics of the transformer 222. The frequency of the internal oscillator 204 may therefore be set independently using well-known integrated circuit oscillator design techniques, which allows the oscillation frequency to be configured according to the application requirements. Such configuration includes varying the frequency of operation of the integrated oscillator 204 without having to change the transformer 222. Variable frequency changes may be useful, for example, to move the operational frequency of the oscillator 204 so as to avoid or reduce interference with other circuits, which may induce frequency spurs.

The use of low-voltage SOI-based transistors also facilitates higher operating frequencies for the oscillator 204 and the output driver 206 compared to high-power discrete transistors, and therefore allows the size of the isolation transformer 222 to be reduced. For example, the transformer-bound frequency of the two discrete transistors 106*a*, 106*b* of FIG. 1 typically would be in the range of about 100 to 500 kHz. In contrast, the oscillator 204 and the output driver 206 in embodiments of the present invention can operate at frequencies in excess of 1 MHz, and in some cases well in excess of 100 MHz when using the UltraCMOS® technology of Peregrine Semiconductor Corporation, thereby allowing the use of much smaller and less expensive transformers, including non-ferrite core and air-core transformers. The ability to use an air-core transformer is particularly useful since such transformers can be readily implemented using printed circuit board (PCB) traces, thus significantly reducing cost and weight for a system.

In addition to the voltage stand-off advantage noted above, utilization of stacked low-voltage SOI-based transistors for the output stage 412 also results in higher efficiencies because the gate charge required to turn them ON and OFF is much lower than the gate charge required for high-power discrete transistors.

Another advantage of integrated circuit implementation of an oscillator and driver circuit in accordance with the present invention is that the rectification function of an isolating DC-to-DC converter circuit may be incorporated onto the same integrated circuit or within the same integrated circuit package; for example, the rectification circuit 112 of FIG. 1 may be embodied on the same integrated circuit die. By detecting the direction of power flow through a connected transformer, or under external direction by command signals provided through the data input 714, the oscillator and driver circuit 700 could either implement a primary winding driving function as described above, or a rectifying function for current being transformed from the secondary winding to the primary winding, thus allowing bi-directional power transfer.

Figure 13:
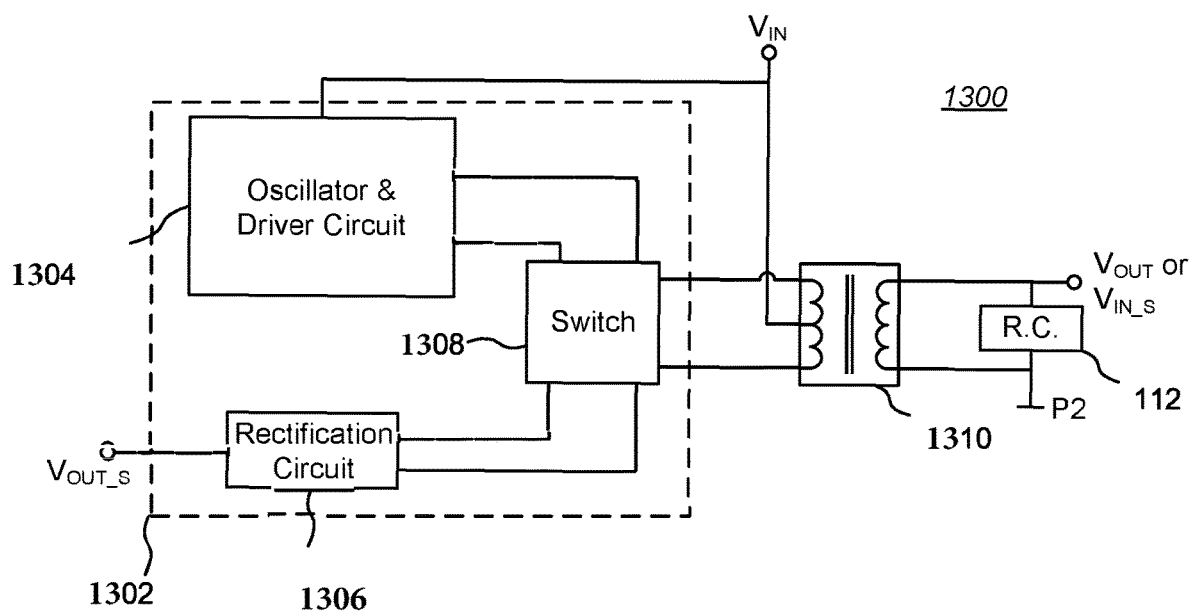
FIG. 13 is a block diagram of an isolating DC-to-DC converter circuit having bi-directional power transfer capability.

For example, FIG. 13 is a block diagram of an isolating DC-to-DC converter circuit having bi-directional power transfer capability. An integrated circuit 1302 includes an oscillator and driver circuit 1304, which may be of the type shown in FIG. 7. Also included is a rectification circuit 1306, which may be of passive or active design. A switch 1308 allows selective connection of the oscillator and driver circuit 1304 to the legs of the primary winding of a coupled transformer 1310, or the connection of the secondary windings of the coupled transformer—coupled through the primary winding—to the rectification circuit 1306. In a primary winding driving mode, the transformer 1310 outputs $V_{OUT}$ in response to the output of the oscillator and driver circuit 1304 passing through the switch 1308. When in the rectifying mode, the transformer 1310 accepts an AC voltage $V_{IN\_S}$ at the terminals of the secondary winding, which is coupled to the rectification circuit 1306 through the primary winding of the transformer 1310 and through the switch 1308 (the rectification circuit 112 would be switched out of circuit by a suitable switch, not shown). The rectification circuit 1306 outputs a DC voltage $V_{OUT\_S}$, which may be provided outside the integrated circuit 1302, as shown, or be utilized entirely internally to the integrated circuit 1302, or both.

Still other advantages of the invention include embodiments with circuitry that selectively enable a current detection circuit to ensure that over-current events are only detected while the switches of the push-pull output stage 712 are fully closed (and not open, or transitioning to or from a closed state), and which provide over-current protection to guard against potentially damaging large load currents.

Methods

Figure 14:
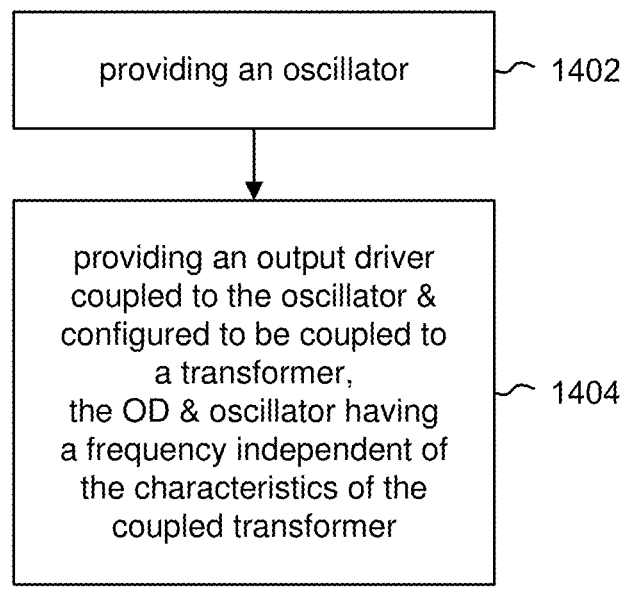
FIG. 14 is a flowchart showing one method for providing an electronic oscillator circuit configured for use in an isolating DC-to-DC converter circuit.

Another aspect of the invention includes methods for providing an electronic oscillator circuit configured for use in an isolating DC-to-DC converter circuit. FIG. 14 is a flowchart showing one method for providing an electronic oscillator circuit configured for use in an isolating DC-to-DC converter circuit, including: providing an oscillator generating a periodic pulse signal (STEP 1402); and providing an output driver, coupled to the oscillator and configured to be coupled to the primary winding of a transformer, for converting the periodic pulse signal to alternating directions of energy flow in the primary winding of the coupled transformer; wherein the periodic pulse signal has a frequency that is independent of the characteristics of the coupled transformer (STEP 1404).

Yet another aspect of the invention includes a method for providing an isolating DC-to-DC converter circuit, including: providing a transformer having a primary winding with a center tap, and a secondary winding; providing an input terminal coupled to the center tap of the primary winding of the transformer, for receiving a direct current input voltage; providing a rectification and filter circuit, coupled to the secondary winding of the transformer, for receiving an alternating voltage from the secondary winding and converting such alternating voltage to a direct current output voltage at an output terminal; and providing an integrated circuit, coupled to the primary winding of the transformer, for inducing alternating directions of energy flow in the primary winding of the transformer for the direct current input voltage, thereby inducing alternating voltage in the secondary winding, the integrated circuit including an oscillator generating a periodic pulse signal having a frequency that is independent of the characteristics of the transformer, and an output driver, coupled to the oscillator, for converting the periodic pulse signal to alternating directions of energy flow in the primary winding of the coupled transformer.

Other aspects of one or more of the above methods include: providing the output driver with a push-pull output stage having two complementary stacks of two or more series-connected field effect transistors (FETs) configured to cause the alternating directions of energy flow in the primary winding of the coupled transformer in response to the periodic pulse signal; the periodic pulse signal of the oscillator having a balanced duty cycle; the frequency of the periodic pulse signal being variable; fabricating the oscillator and output driver on an integrated circuit using silicon-on-insulator fabrication technology; deactivating at least one of the oscillator and the output driver in response to detection of at least one fault event; reactivating the deactivated one of the oscillator and the output driver based on passage of time; reactivating the deactivated one of the oscillator and the output driver based on an absence of a previously detected fault event; providing a sense and control circuit, coupled to at least one of the oscillator and the output driver, configured to deactivate at least one of the oscillator and the output driver based on a detected fault event; deactivating at least one of the oscillator and the output driver based on an over-current event, a short-circuit event, an over-voltage or under-voltage event, and/or an over-temperature event; the transformer having only primary and secondary windings.

Additional aspects of the invention include methods for over-current protection. For example, FIG. 15 is a flowchart 1500 of a first method for over-current protection of a driving circuit for an isolating DC-to-DC converter circuit, including: generating a periodic pulse signal in the driving circuit (STEP 1502); converting the periodic pulse signal to complementary and non-overlapping switch control signals for first and second switches, the first and second switches providing alternating directions of energy flow in the primary winding of a coupled transformer (STEP 1504); and limiting current measurements through a selected one of the first or second switches to only periods when such selected switch is fully closed (STEP 1506).

Figure 15:
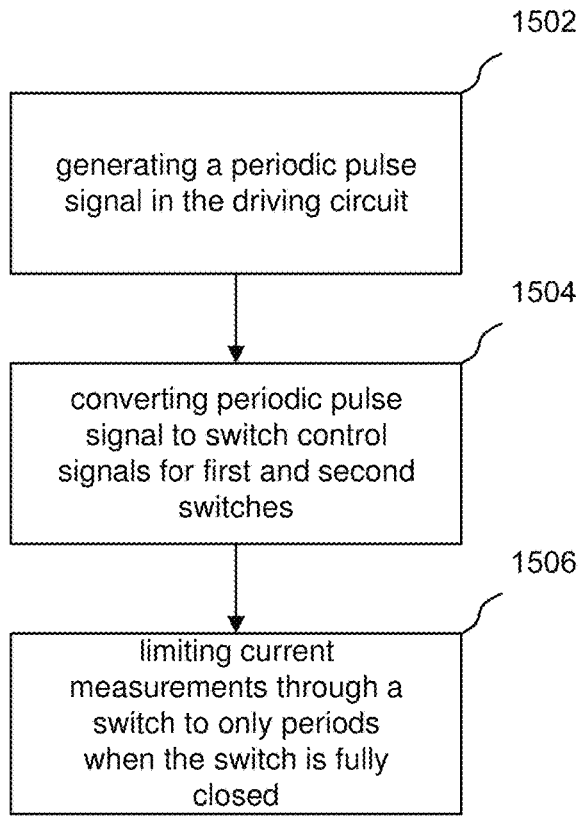
FIG. 15 is a flowchart of a first method for over-current protection of a driving circuit for an isolating DC-to-DC converter circuit.

Other aspects of the method of FIG. 15 include one or more of the following:

limiting current measurements includes generating edge blanking pulses from the periodic pulse signal, the edge blanking pulses selectively enabling a coupled output current measurement circuit;

gate drive pulses being derived from the periodic pulse signal, further including providing a delay circuit coupled to receive the periodic pulse signal, and output delayed pulses therefrom, providing a logic circuit, coupled to receive the periodic pulse signal and the delayed pulses, and output retimed over-current detection pulses having an edge blanking characteristic with respect to the gate drive pulses derived from the periodic pulse signal;

the provided delay circuit including a resistor for receiving an input pulse stream, a shunt capacitor coupled between the input resistor and circuit ground, and an output buffer coupled to a node between the resistor and the capacitor, for outputting a delayed pulse stream;

selectively enabling the logic circuit by a coupled over-current detection control signal;

gate drive pulses being derived from the periodic pulse signal, further including providing a delay circuit coupled to receive the periodic pulse signal, and output delayed pulses therefrom, providing a first logic circuit, coupled to receive the delayed pulses and an over-current detection control signal, and output the delayed pulses only if enabled by the over-current detection control signal, providing a second logic circuit, coupled to receive the delayed pulses from the first logic circuit and to receive the periodic pulse signal, and output retimed over-current detection pulses having an edge blanking characteristic with respect to the gate drive pulses derived from the periodic pulse signal;

gate drive pulses being derived from the periodic pulse signal, and further including providing a delay/reduce circuit coupled to receive the periodic pulse signal, and output delayed and reduced pulses therefrom having an edge blanking characteristic with respect to the gate drive pulses derived from the periodic pulse signal; and the provided delay/reduce circuit including a resistor for receiving an input pulse stream at an input node, a shunt capacitor coupled between the input resistor and circuit ground, a diode coupled to a node between the resistor and the capacitor and to the input node of the resistor, and an output buffer coupled to the node between the resistor and the capacitor, for outputting a delayed and reduced mark pulse stream.

Figure 16:
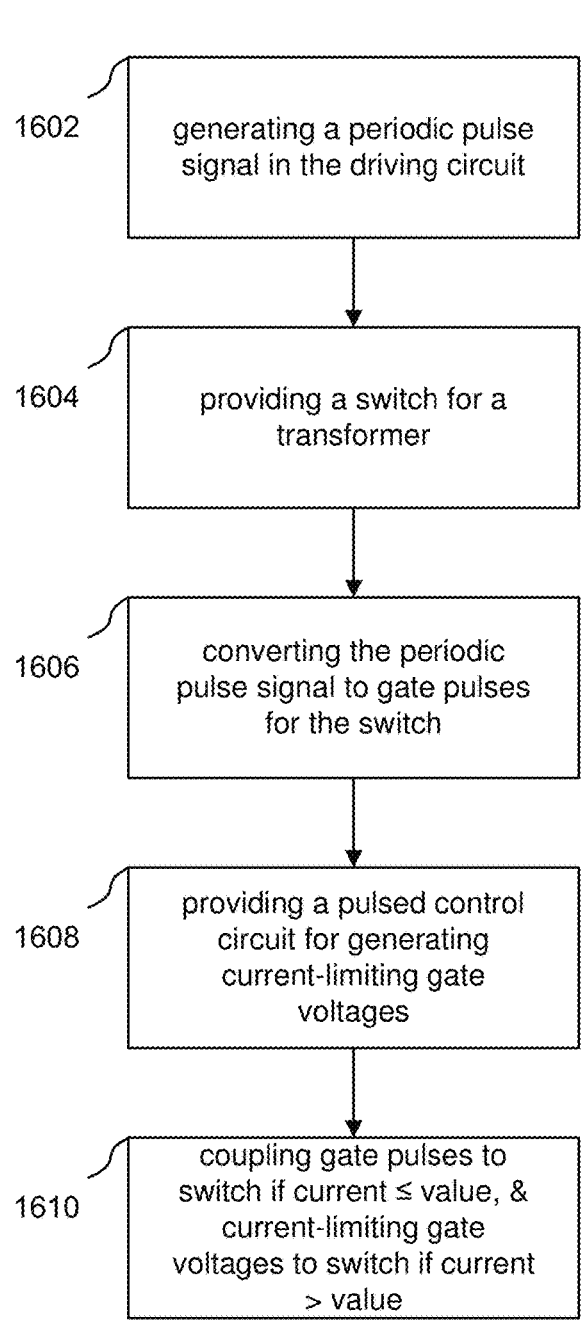
FIG. 16 is a flowchart of a second method for over-current protection of a driving circuit for an isolating DC-to-DC converter circuit Like reference numbers and designations in the various drawings indicate like elements.

As another example, FIG. 16 is a flowchart 1600 of a second method for over-current protection of a driving circuit for an isolating DC-to-DC converter circuit, including: generating a periodic pulse signal in the driving circuit (STEP 1602); providing a switch, configured to be coupled to the primary winding of a transformer, for providing energy flow in the primary winding of the coupled transformer (STEP 1604); converting the periodic pulse signal to gate pulses for the switch (STEP 1606); providing a pulsed control circuit for generating current-limiting gate voltages (STEP 1608); and coupling the gate pulses to the switch if current through the switch is not greater than a selected value, and coupling the current-limiting gate voltages to the switch if current through the switch is greater than a selected value (STEP 1610).

Other aspects of the method of FIG. 16 include one or more of the following:

The pulsed control circuit including a current mirror circuit;

comparing a first voltage derived from a first reference current to a second voltage in the switch indicative of the current through the switch, and generating a comparison signal indicating whether the current through the switch is greater or not greater than a selected value;

limiting the amount of time that the current-limiting gate voltages are coupled to the switch; and selectively coupling the gate pulses to the switch after a specified time has elapsed since the current-limiting gate voltages were coupled to the switch.

Fabrication Technologies and Options

The term "MOSFET" technically refers to metal-oxide-semiconductors; another synonym for MOSFET is "MISFET", for metal-insulator-semiconductor FET. However, "MOSFET" has become a common label for most types of insulated-gate FETs ("IGFETs"). Despite that, it is well known that the term "metal" in the names MOSFET and MISFET is now often a misnomer because the previously metal gate material is now often a layer of polysilicon (polycrystalline silicon). Similarly, the "oxide" in the name MOSFET can be a misnomer, as different dielectric materials are used with the aim of obtaining strong channels with smaller applied voltages. Accordingly, the term "MOSFET" as used herein is not to be read as literally limited to metal-oxide-semiconductors, but instead includes IGFETs in general.

As should be readily apparent to one of ordinary skill in the art, various embodiments of the invention can be implemented to meet a wide variety of specifications. Unless otherwise noted above, selection of suitable component values is a matter of design choice and various embodiments of the invention may be implemented in any suitable integrated circuit technology (including but not limited to MOSFET and IGFBT structures). Integrated circuit embodiments may be fabricated using any suitable substrates and processes, including but not limited to standard bulk silicon, silicon-on-insulator (SOI), silicon-on-sapphire (SOS), GaN HEMT, GaAs pHEMT, and MESFET technologies. However, the inventive concepts described above are particularly useful with an SOI-based fabrication process (including SOS), and with fabrication processes having similar characteristics. Fabrication in CMOS on SOI or SOS enables low power consumption, the ability to withstand high power signals during operation due to FET stacking, good linearity, and high frequency operation. Monolithic integrated circuit implementation is particularly useful since parasitic capacitances generally can be kept low (or at a minimum, kept uniform across all units, permitting them to be compensated) by careful design.

Voltage levels may be adjusted or voltage and/or logic signal polarities reversed depending on a particular specification and/or implementing technology (e.g., NMOS, PMOS, or CMOS, and enhancement mode or depletion mode transistor devices). Component voltage, current, and power handling capabilities may be adapted as needed, for example, by adjusting device sizes, serially "stacking" components (particularly FETs) to withstand greater voltages, and/or using multiple components in parallel to handle greater currents. Additional circuit components may be added to enhance the capabilities of the disclosed circuits and/or to provide additional functional without significantly altering the functionality of the disclosed circuits.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion. It is to be understood that the foregoing description is intended to illustrate and not to limit the scope of the invention, which is defined by the scope of the following claims, and that other embodiments are within the scope of the claims.

What is claimed is:

1. An integrated circuit embodying an electronic oscillator circuit configured for use in an isolating DC-to-DC converter circuit, the integrated circuit including:
    (a) an oscillator generating a periodic pulse signal;
    (b) a switch, configured to be coupled to the primary winding of a transformer, for providing energy flow in the primary winding of the coupled transformer;
    (c) an output driver, coupled to the oscillator, for converting the periodic pulse signal to gate pulses for the switch;
    (d) a pulsed control circuit for generating current-limiting gate voltages comprising a current mirror circuit;
    (e) an over-current protection circuit, coupled between the output driver and the switch, and coupled to the pulsed control circuit, for selectively coupling the gate pulses to the switch if current through the switch is not greater than a selected value, and for selectively coupling the current-limiting gate voltages from the current mirror to the switch if current through the switch is greater than a selected value.

2. The invention of claim 1, wherein the over-current protection circuit includes a comparator, coupled to a first voltage derived from a first reference current, and to a second voltage in the switch indicative of the current through the switch, for generating a comparison signal indicating whether the current through the switch is greater or not greater than a selected value.

3. The invention of claim 1, wherein the over-current protection circuit includes a timing circuit for limiting the amount of time that the current-limiting gate voltages are coupled to the switch.

4. The invention of claim 1, wherein the over-current protection circuit includes a timing circuit that selectively couples the gate pulses to the switch after a specified time has elapsed since the current-limiting gate voltages were coupled to the switch.

5. A method for over-current protection of a driving circuit for an isolating DC-to-DC converter circuit:
    (a) generating a periodic pulse signal in the driving circuit;
    (b) providing a switch, configured to be coupled to the primary winding of a transformer, for providing energy flow in the primary winding of the coupled transformer;
    (c) converting the periodic pulse signal to gate pulses for the switch;
    (d) providing a pulsed control circuit having a current mirror for generating current-limiting gate voltages; and
    (e) coupling the gate pulses to the switch if current through the switch is not greater than a selected value, and coupling the current-limiting gate voltages from the current mirror to the switch if current through the switch is greater than a selected value.

6. The method of claim 5, further including:
    (a) comparing a first voltage derived from a first reference current to a second voltage in the switch indicative of the current through the switch; and
    (b) generating a comparison signal indicating whether the current through the switch is greater or not greater than a selected value.

7. The method of claim 5, further including limiting the amount of time that the current-limiting gate voltages are coupled to the switch.

8. The method of claim 5, further including selectively coupling the gate pulses to the switch after a specified time has elapsed since the current-limiting gate voltages were coupled to the switch.

* * * * *